United States Patent
Lynn et al.

(10) Patent No.: US 11,825,845 B2
(45) Date of Patent: Nov. 28, 2023

(54) SLIPPERY LIQUID-INFUSED POROUS SURFACES THAT RELEASE HYDROPHILIC AND HYDROPHOBIC AGENTS

(71) Applicant: Wisconsin Alumni Research Foundation, Madison, WI (US)

(72) Inventors: David M. Lynn, Middleton, WI (US); Harshit Agarwal, Madison, WI (US)

(73) Assignee: Wisconsin Alumni Research Foundation

( * ) Notice: Subject to any disclaimer, the term of this patent is extended or adjusted under 35 U.S.C. 154(b) by 105 days.

(21) Appl. No.: 17/390,568

(22) Filed: Jul. 30, 2021

(65) Prior Publication Data

US 2022/0030869 A1 Feb. 3, 2022

Related U.S. Application Data

(60) Provisional application No. 63/059,028, filed on Jul. 30, 2020.

(51) Int. Cl.
| | | |
|---|---|---|
| A01N 43/52 | (2006.01) | |
| A01N 25/10 | (2006.01) | |
| A01N 43/08 | (2006.01) | |
| A01N 25/04 | (2006.01) | |
| A01P 1/00 | (2006.01) | |

(52) U.S. Cl.
CPC ............ *A01N 43/52* (2013.01); *A01N 25/04* (2013.01); *A01N 25/10* (2013.01); *A01N 43/08* (2013.01); *A01P 1/00* (2021.08)

(58) Field of Classification Search
CPC ........ A01N 43/52; A01N 25/04; A01N 25/10; A01N 43/08; A01N 25/00; A01P 1/00
See application file for complete search history.

(56) References Cited

U.S. PATENT DOCUMENTS

| | | |
|---|---|---|
| 7,642,285 B2 | 1/2010 | Blackwell et al. |
| 7,883,720 B2 | 2/2011 | Lynn et al. |
| 7,910,622 B2 | 3/2011 | Blackwell et al. |
| 8,071,210 B2 | 12/2011 | Lynn et al. |
| 8,097,277 B2 | 1/2012 | Lynn et al. |
| 8,269,024 B2 | 9/2012 | Blackwell et al. |
| 8,324,333 B2 | 12/2012 | Liu et al. |
| 8,367,680 B2 | 2/2013 | Blackwell et al. |
| 8,524,368 B2 | 9/2013 | Lynn et al. |
| 8,624,063 B2 | 1/2014 | Blackwell et al. |
| 8,716,422 B2 | 5/2014 | Liu et al. |
| 8,815,943 B2 | 8/2014 | Blackwell et al. |
| 10,487,217 B2 | 11/2019 | Lynn et al. |
| 10,557,042 B2 | 2/2020 | Lynn et al. |
| 10,557,044 B2 | 2/2020 | Lynn et al. |
| 11,046,854 B2 | 6/2021 | Lynn et al. |
| 2005/0027064 A1 | 2/2005 | Lynn et al. |
| 2009/0170179 A1 | 7/2009 | Lynn et al. |
| 2010/0048736 A1 | 2/2010 | Liu et al. |
| 2011/0117138 A1 | 5/2011 | Lynn et al. |
| 2011/0306142 A1 | 12/2011 | Lynn et al. |
| 2012/0027833 A1 | 2/2012 | Zilberman |
| 2012/0134926 A1 | 5/2012 | Lynn et al. |
| 2013/0122055 A1 | 5/2013 | Liu et al. |
| 2013/0129907 A1 | 5/2013 | Popa et al. |
| 2014/0147627 A1 | 5/2014 | Aizenberg et al. |
| 2014/0187666 A1 | 7/2014 | Aizenberg et al. |
| 2014/0220617 A1 | 8/2014 | Yung et al. |
| 2014/0328999 A1 | 11/2014 | Aizenberg et al. |
| 2015/0152270 A1 | 6/2015 | Aizenberg et al. |
| 2015/0173883 A1 | 6/2015 | Ingber et al. |
| 2015/0175814 A1 | 6/2015 | Aizenberg et al. |
| 2015/0196940 A1 | 7/2015 | Aizenberg et al. |
| 2015/0209198 A1 | 7/2015 | Aizenberg et al. |
| 2017/0022371 A1 | 1/2017 | Lynn et al. |
| 2018/0230318 A1* | 8/2018 | Lynn et al. ............... C09D 5/14 5/14 |
| 2020/0181419 A1 | 6/2020 | Carter et al. |
| 2020/0299520 A1 | 9/2020 | Lynn et al. |
| 2022/0032338 A1 | 2/2022 | Lynn et al. |

OTHER PUBLICATIONS

U.S. Appl. No. 16/211,078, filed Dec. 5, 2018.
U.S. Appl. No. 15/192,364, filed Jun. 24, 2016.
U.S. Appl. No. 15/192,425, filed Jun. 24, 2016.
U.S. Appl. No. 16/740,064, filed Jan. 10, 2020.
U.S. Appl. No. 15/471,628, filed Mar. 28, 2017.
U.S. Appl. No. 16/740,008, filed Jan. 10, 2020.
U.S. Appl. No. 17/390,559, filed Jul. 30, 2021.
Allen et al. (Mar. 14, 2014) "Targeting virulence: can we make evolution-proof drugs?" Nat. Rev. Microbiol. 12:300-308.
Alongi et al. (2013) "Layer by Layer coatings assembled through dipping, vertical or horizontal spray for cotton flame retardancy," Carbohydr Polym., 92: 114-119.
An et al. (May 2018) "Covalent layer-by-layer films: chemistry, design, and multidisciplinary applications," Chem. Soc. Rev. 47: 5061-5098.
Antipov et al. (2001) "Sustained Release Properties of Polyelectrolyte Multilayer Capsules," J. Phys. Chem. B. 105:2281-2284.

(Continued)

*Primary Examiner* — Robert A Wax
*Assistant Examiner* — Andre Mach
(74) *Attorney, Agent, or Firm* — Leydig, Voit & Mayer, Ltd.

(57) ABSTRACT

The present invention provides materials and methods of making materials, where at least one surface of the material utilizes an emulsion to controllably release active agents, which can include hydrophilic agents, into the surrounding environment. Preferably, the materials are 'slippery' in that liquid droplets and other compounds, such as aqueous fluids, organic compounds and microorganisms, are able to easily slide off the surface without adhering to the surface. The active agents released by the emulsion may include antimicrobial agents, antifungal agents, antibacterial agents and other molecules that can kill or otherwise reduce the number of the pathogens. The resulting materials have improved anti-fouling behaviors compared to many other existing types of anti-fouling surfaces.

28 Claims, 17 Drawing Sheets

(56) References Cited

OTHER PUBLICATIONS

Appadoo et al. (Jul. 2016) "Controlling the Surface-Mediated Release of DNA Using 'Mixed Multilayers'", *Bioengineering & Translational Medicine*, 1(2):181-192.
Arciola et al. (2012) "Biofilm formation in *Staphylococcus* implant infections. A review of molecular mechanisms and implications for biofilm-resistant materials," Biomaterials. 33:5967-5982.
Bae et al. (Dec. 18, 2013) "25th Anniversary Article: Scalable Multiscale Patterned Structures Inspired by Nature: The Role of Hierarchy," Adv. Mater. 26:675-700.
Bai et al. (2011) "Recent Advances in Colloidal and Interfacial Phenomena Involving Liquid Crystals," Langmuir. 27:5719-5738.
Banerjee et al. (2011) "Antifouling Coatings: Recent Developments in the Design of Surfaces That Prevent Fouling by Proteins, Bacteria, and Marine Organisms," Adv. Mater. 23:690-718.
Barthlott et al. (1997) "Purity of the sacred lotus, or escape from contamination in biological surfaces," Planta. 202:1-8.
Bassler et al. (2006) "Bacterially speaking," Cell. 125:237-246.
Bellanger et al. (Jan. 9, 2014) "Chemical and Physical Pathways for the Preparation of Superoleophobic Surfaces and Related Wetting Theories," Chem. Rev. 114:2694-2716.
Bergbreiter et al. (2009) "Covalent layer-by-layer assembly-an effective, forgiving way to construct functional robust ultrathin films and nanocomposites", Soft Matter, 5(1):23.
Bhardwaj et al. (2010) "Electrospinning: a fascinating fiber fabrication technique," Biotechnology Advances, 28(3): 325-347.
Bhargava et al. (1996) "Triclosan: applications and safety," Am. J. Infect. Control. 24:209-218.
Borges et al. (Aug. 2014) "Molecular Interactions Driving the Layer-by-Layer Assembly of Multilayers," *Chemical Reviews*, 114(18):8883.
Bortleson et al. (1972) "Recent sedimentary history of Lake Mendota, Wis," Environ. Sci. Technol. 6:799-808.
Boudou et al. (2010) "Multiple functionalities of polyelectrolyte multilayer films: new biomedical applications," Adv. Mater. 22:441-467.
Brake et al. (2003) "Biomolecular interactions at phospholipid-decorated surfaces of liquid crystals," Science. 302:2094-2097.
Breitbach et al. (2011) "Surface-mediated release of a synthetic small-molecule modulator of bacterial quorum sensing: Gradual release enhances activity," Chem. Comm. 47:370-372.
Brock et al. (1984) "Significance of algal excretory products for growth of epilimnetic bacteria," Appl. Environ. Microbiol. 47:731-734.
Broderick et al. (2011) "Fabrication and Selective Functionalization of Amine-Reactive Polymer Multilayers on Topographically Patterned Microwell Cell Culture Arrays", *Biomacromolecules*, 12(6):1998-2007.
Broderick et al. (2012) "Covalent Layer-by-Layer Assembly of Water-Permeable and Water-Impermeable Polymer Multilayers on Highly Water-Soluble and Water-Sensitive Substrates," Chem. Mater. 24:1786-1795.
Broderick et al. (2012) "In situ Synthesis of Oligonucleotide Arrays on Surfaces Coated with Crosslinked Polymer Multilayers," Chem. Mater. 24:938-945.
Broderick et al. (2012) in Functional Polymers by Post-Polymerization Modification: Concepts, Practical Guidelines, and Applications, Theato and Klok Eds., Wiley-VCH; pp. 371-406.
Broderick et al. (2013) "Fabrication of Oligonucleotide and Protein Arrays on Rigid and Flexible Substrates Coated with Reactive Polymer Multilayers", *ACS Applied Materials & Interfaces*, 5(2):351.
Broderick et al. (Jan. 20, 2013) "Surface-mediated release of a small-molecule modulator of bacterial biofilm formation: A non-bactericidal approach to inhibiting biofilm formation in Pseudomonas aeruginosa," Adv. Healthcare Mater. 2:993-1000.
Broderick et al. (Jun. 28, 2014) "Surface coatings that promote rapid release of peptide-based AgrC inhibitors for attenuation of quorum sensing in *Staphylococcus aureus*," Adv. Healthcare Mater. 3:97-105.

Buck et al. (2007) "Layer-by-layer assembly of reactive ultrathin films mediated by click-type reactions of poly(2-alkenyl azlactone)s," Adv. Mater. 19:3951-3955.
Buck et al. (2009) "Chemical Modification of Reactive Multilayered Films Fabricated from Poly(2-alkenyl azlactone)s: Design of Surfaces that Prevent or Promote Mammalian Cell Adhesion and Bacterial Biofilm Growth," Biomacromolecules. 10:1564-1574.
Buck et al. (2010) "Free-Standing and Reactive Thin Films Fabricated by Covalent Layer-by-Layer Assembly and Subsequent Lift-Off of Azlactone-Containing Polymer Multilayers," Langmuir 26(20): 16134-16140.
Buck et al. (2010) "Functionalization of Fibers Using Azlactone-Containing Polymers: Layer-by-Layer Fabrication of Reactive Thin Films on the Surfaces of Hair and Cellulose-Based Materials," ACS Appl. Mater. Interfaces. 2:1421-1429.
Buck et al. (2010) "Superhydrophobic thin films fabricated by reactive layer-by-layer assembly of azlactone-functionalized polymers," Chem. Mater. 22:6319-6327.
Buck et al. (2010) "Reactive Layer-by-Layer Assembly of Suspended Thin Films and Semipermeable Membranes at Interfaces Created Between Aqueous and Organic Phases," *Advanced Materials*, 22(9):994.
Buck et al. (Oct. 12, 2011) "Azlactone-functionalized polymers as reactive platforms for the design of advanced materials: Progress in the last ten years," Polym. Chem. 3:66-80.
Busscher et al. (2012) "Biomaterial-associated infection: Locating the finish line in the race for the surface," Sci. Transl. Med. 4:153rv110.
Cadwell et al. (2006) "Infrared Spectroscopy of Competitive Interactions between Liquid Crystals, Metal Salts, and Dimethyl Methylphosphonate at Surfaces," The Journal of Physical Chemistry B, 110: 26081-26088.
Cai et al. (Feb. 2014) "Filefish-Inspired Surface Design for Anisotropic Underwater Oleophobicity," Adv. Funct. Mater. 24(6):809-816.
Camilli et al. (2006) "Bacterial small-molecule signaling pathways," Science. 311:1113-1116.
Campoccia et al. (Aug. 15, 2013) "A review of the biomaterials technologies for infection-resistant surfaces," Biomaterials. 34:8533-8554.
Carter et al. (Jul. 2016) "Synthesis and Characterization of Backbone Degradable Azlactone-Functionalized Polymers," *Macromolecules*, 49(15):5514.
Carter et al. (Jul. 2020) "Influence of Side Chain Hydrolysis on the Evolution of Nanoscale Roughness and Porosity in Amine-Reactive Polymer Multilayers," Chem. Mater., 32: 6935-6946.
Carter et al. (Jun. 2016) "Covalently Crosslinked and Physically Stable Polymer Coatings with Chemically Labile and Dynamic Surface Features Fabricated by Treatment of Azlactone-Containing Multilayers with Alcohol-, Thiol-, and Hydrazine-Based Nucleophiles," *Chemistry of Materials*, 28(14):5063.
Cassie et al. (1944) "Wettability of porous surfaces," Trans. Faraday Soc. 40:546-551.
Chapman et al. (2000) "Surveying for Surfaces that Resist the Adsorption of Proteins," J. Am. Chem. Soc. 122:8303-8304.
Chu et al. (Jan. 31, 2014) "Superamphiphobic surfaces," Chem. Soc. Rev. 43:2784-2798.
Chung et al. (2002) "Methods of Loading and Releasing Low Molecular Weight Cationic Molecules in Weak Polyelectrolyte Multilayer Films," Langmuir. 18:1176-1183.
Clatworthy et al. (2007) "Targeting virulence: a new paradigm for antimicrobial therapy," Nat. Chem. Biol. 3:541-548.
Costerton et al. (1999) "Bacterial biofilms: A common cause of persistent infections," Science. 284:1318-1322.
Daniel et al. (Jun. 2013) "Lubricant-infused micro/nano-structured surfaces with tunable dynamic omniphobicity at high temperatures," Appl. Phys. Lett. 102:231603.
Daristotle et al. (Dec. 2016) "A Review of the Fundamental Principles and Applications of Solution Blow Spinning," ACS Appl. Mater. Interfaces, 8(51):34951-34963.
De Kievit et al. (2001) "Quorum-sensing genes in Pseudomonas aeruginosa biofilms: their role and expression patterns," Appl. Environ. Microbiol. 67:1865-1873.

(56) References Cited

OTHER PUBLICATIONS

Decher (1997) "Fuzzy nanoassemblies Toward layered polymeric multicomposites", *Science*, 277(5330): 1232.
Deng et al. (2010) "Laundering Durability of Superhydrophobic Cotton Fabric," Adv. Mater. 22:5473-5477.
Deng et al. (2011) "Transparent, Thermally Stable and Mechanically Robust Superhydrophobic Surfaces Made from Porous Silica Capsules," Adv. Mater. 23:2962-2965.
Deng et al. (2012) "Candle soot as a template for a transparent robust superamphiphobic coating," Science. 335:67-70.
Dierendonck et al. (Feb. 2014) "Just spray it—LbL assembly enters a new age," Soft Matter, 10: 804-807.
Eibergen et al. (Oct. 13, 2015) "Potent and selective modulation of the RhlR quorum sensing receptor by using non-native ligands: An emerging target for virulence control in Pseudomonas aeruginosa," ChemBioChem. 16(16):2348-2356.
Epstein et al. (2012) "Liquid-infused structured surfaces with exceptional anti-biofouling performance," Proc. Natl. Acad. Sci. USA. 109:13182-13187.
Feng et al. (2002) "Super-Hydrophobic Surfaces: From Natural to Artificial," Adv. Mater. 14:1857-1860.
Feng et al. (2006) "Design and Creation of Superwetting/Antiwetting Surfaces," Adv. Mater. 18: 3063-3078.
Fredin et al. (2013) Nanoimprinted Thin Films of Reactive, Azlactone-Containing Polymers Combining Methods for the Topographic Patterning of Cell Substrates with Opportunities for Facile Post-Fabrication Chemical Functionalization, *Biomacromolecules*, 10(4):994-1003.
Frei et al. (2012) "2-Aminobenzimidazole derivatives strongly inhibit and disperse Pseudomonas aeruginosa biofilms," Angew. Chem. Int. Ed. 51:5226-5229.
Gao et al. (2004) "Biophysics: Water-repellent legs of water striders," Nature. 432:36.
Gardner et al. (2011) Reactive Polyanions Based on Poly(4,4-dimethyl-2-vinyl-2-oxazoline-5-one-co-methacrylic acid). *Macromolecules*, 44(18):7115.
Genzer et al. (2000) "Creating long-lived superhydrophobic polymer surfaces through mechanically assembled monolayers," Science. 290:2130-2133.
Geske et al. (2008) "Comparative analyses of N-acylated homoserine Lactones reveal unique structural features that dictate their ability to activate or inhibit quorum sensing," ChemBioChem. 9:389-400.
Geske et al. (2008) "Evaluation of a focused library of N-aryl L-homoserine lactones reveals a new set of potent quorum sensing modulators," Bioorg. Med. Chem. Lett. 18:5978-5981.
Gilbert et al. (2013) "Depth-profiling X-ray photoelectron spectroscopy (XPS) analysis of interlayer diffusion in polyelectrolyte multilayers," *Proceedings of the National Academy of Sciences*, 110(17):6651.
Glavan et al. (Jul. 26, 2013) "Omniphobic 'RF Paper' Produced by Silanization of Paper with Fluoroalkyltrichlorosilanes," Adv. Funct. Mater. 24:60-70.
Grinthal et al. (Oct. 14, 2013) "Mobile interfaces: Liquids as a perfect structural material for multifunctional, antifouling surfaces," Chem. Mater. 26:698-708.
Guo et al. (Nov. 2015) "Covalent Immobilization of Caged Liquid Crystal Microdroplets on Surfaces," *ACS Applied Materials & Interfaces*, 7(48):26892.
Hammond (1999) "Recent explorations in electrostatic multilayer thin film assembly," Curr. Opin. Colloid Interface Sci. 4: 430-442.
Hammond (2004) "Form and Function in Multilayer Assembly New Applications at the Nanoscale," *Advanced Materials*, 16(15):1271.
Hammond (2011) "P. T. Engineering materials layer-by-layer: Challenges and opportunities in multilayer assembly," *AIChE Journal*, 57(11):2928.
Heilmann et al. (1984) "Chemistry of alkenyl azlactones. I. Radiation-sensitive materials derived from azlactone-containing copolymers," J. Polym. Sci. Part A. 22(5):1179-1186.
Heilmann et al. (1998) "The chemistry of 2-alkenyl-5(4H)-oxazolones. VIII acid-catalyzed reaction with alcohols," Tetrahedron. 54(40):12151-12160.

Heilmann et al. (2001) "Chemistry and technology of 2-alkenyl azlactones," J. Polymer Sci. Part A. 39(21):3655-3677.
Heilmann et al. (2003) "The Chemistry of 2-Alkenyl-5(4H)-Oxazolones. IX. Acid-Catalyzed Oligomerization," J. of Macromolecular Science, Part A, 40(8):755.
Holden et al. (Oct. 2015) "Photolithographic Synthesis of High-Density DNA and RNA Arrays on Flexible, Transparent, and Easily Subdivided Plastic Substrates", *Analytical Chemistry*, 87(22):11420.
Holloway (1955) "Genetic recombination in Pseudomonas aeruginosa," J. Gen. Microbiol. 13:572-581.
Howell et al. (Feb. 4, 2015) "Stability of Surface-Immobilized Lubricant Interfaces under Flow," Chem. Mater. 27:1792-1800.
Howell et al. (Jul. 23, 2014) "Self-Replenishing Vascularized Fouling-Release Surfaces," ACS Appl. Mater. Inter. 6:13299-13307.
Huang et al. (2011) "Controllable Underwater Oil-Adhesion-Interface Films Assembled from Nonspherical Particles," Adv. Funct. Mater. 21:4436-4441.
Huang et al. (Sep. 4, 2013) "Omniphobic slippery coatings based on lubricant-infused porous polyelectrolyte multilayers," ACS Macro Lett. 2:826-829.
Ionov et al. (2012) "Self-healing superhydrophobic materials," Phys. Chem. Chem. Phys. 14:10497-10502.
Izquierdo et al. (2005) "Dipping versus Spraying: Exploring the Deposition Conditions for Speeding Up Layer-by-Layer Assembly," Langmuir, 21(16), 7558-7567.
Jewell et al. (2008) "Multilayered polyelectrolyte assemblies as platforms for the delivery of DNA and other nucleic acid-based therapeutics," Adv. Drug Deliver. Rev. 60:979-999.
Ji et al. (2006) "Fabrication of a Superhydrophobic Surface from the Amplified Exponential Growth of a Multilayer," Adv. Mater. 18:1441-1444.
Jin et al. (2011) "Underwater Oil Capture by a Three-Dimensional Network Architectured Organosilane Surface," Adv. Mater. 23:2861-2864.
Jisr et al. (2005) "Hydrophobic and Ultrahydrophobic Multilayer Thin Films from Perfluorinated Polyelectrolytes," Angew. Chem. Int. Ed. 44:782-785.
Johnston et al. (2007) "Assembling DNA into Advanced Materials: From Nanostructured Films to Biosensing and Delivery Systems," Adv. Mater. 19 :3727-3730.
Jones et al. (2000) "Triclosan: A review of effectiveness and safety in health care settings," Am. J. Infect. Control. 28:184-196.
Jung et al. (2009) "Wetting Behavior of Water and Oil Droplets in Three-Phase Interfaces for Hydrophobicity/philicity and Oleophobicity/philicity," Langmuir. 25:14165-14173.
Kharlampieva et al. (2004) "Release of a Dye from Hydrogen-Bonded and Electrostatically Assembled Polymer Films Triggered by Adsorption of a Polyelectrolyte," Langmuir. 20:9677-9685.
Kharlampieva et al. (2009) "Layer-by-Layer Hydrogen-Bonded Polymer Films: From Fundamentals to Applications," Adv. Mater. 21: 3053-3065.
Kim et al. (2008) "Hydrogen-Bonding Layer-by-Layer-Assembled Biodegradable Polymeric Micelles as Drug Delivery Vehicles from Surfaces," ACS Nano. 2:386-392.
Kim et al. (2012) "Liquid-Infused Nanostructured Surfaces with Extreme Anti-Ice and Anti-Frost Performance," ACS Nano. 6:6569-6577.
Kim et al. (2013) "Hierarchical or Not? Effect of the Length Scale and Hierarchy of the Surface Roughness on Omniphobicity of Lubricant-Infused Substrates," Nano Lett. 13:1793-1799.
Kinsinger et al. (2008) "Dynamic Ordering Transitions of Liquid Crystals Driven by Interfacial Complexes Formed between Polyanions and Amphiphilic Polyamines", *Langmuir*, 24(23):13231.
Kojic et al. (2004) "Candida infections of medical devices," Clin. Microbiol. Rev. 17:255-267.
Kool et al. (Nov. 12, 2013) "Fast Hydrazone Reactants: Electronic and Acid/Base Effects Strongly Influence Rate at Biological pH," Journal of the American Chemical Society. 135(47):17663-17666.
Kota et al. (2012) "Hygro-responsive membranes for effective oil—water separation," Nat. Commun. 3:1025.
Kratochvil et al. (Aug. 26, 2015) "Nanoporous superhydrophobic coatings that promote the extended release of water-labile quorum

(56) References Cited

OTHER PUBLICATIONS sensing inhibitors and enable long-term modulation of quorum sensing in *Staphylococcus aureus*," ACS Biomater. Sci. Eng. 1:1039-1049.
Kratochvil et al. (May 2016) "Slippery Liquid-Infused Porous Surfaces that Prevent Bacterial Surface Fouling and Inhibit Virulence Phenotypes in Surrounding Planktonic Cells", *ACS Infectious Diseases*, 2(7): 509.
Kratochvil et al., (2017) "Amine-Reactive Azlactone-Containing Nanofibers for the Immobilization and Patterning of New Functionality on Nanofiber-Based Scaffolds", *ACS Applied Materials and Interfaces*, 9:10243-10253.
Krogman et al. (2009) "Spraying asymmetry into functional membranes layer-by-layer," Nat. Mater. 8: 512-518.
Kyung et al. (2011) "Nanoscale Texture Control of Polyelectrolyte Multilayer Using Spray Layer-by-Layer Method," Japanese Journal of Applied Physics, 50: 025602.
Lefort et al. (2010) "Spray-On Organic/Inorganic Films: A General Method for the Formation of Functional Nano- to Microscale Coatings," Angew. Chem. Int. Ed., 49: 10110-10113.
Lefort et al. (2011) "Simultaneous Spray Coating of Interacting Species: General Rules Governing the Poly(styrene sulfonate)/Poly(allylamine) System," Langmuir, 27: 4653-4660.
Lefort et al. (2013) "Nanosized Films Based on Multicharged Small Molecules and Oppositely Charged Polyelectrolytes Obtained by Simultaneous Spray Coating of Interacting Species," Langmuir, 29: 14536-14544.
Leslie et al. (Oct. 12, 2014) "A bioinspired omniphobic surface coating on medical devices prevents thrombosis and biofouling," Nat. Biotechnol. 32:1134-1140.
Levkin et al. (2009) "Porous Polymer Coatings: a Versatile Approach to Superhydrophobic Surfaces," Adv. Funct. Mater. 19:1993-1998.
Li et al. (2010) "Bioinspired self-healing superhydrophobic coatings," Angew. Chem. Int. Ed. 49:6129-6133.
Li et al. (2012) "Layer-by-layer assembly for rapid fabrication of thick polymeric films," Chem. Soc. Rev., 41: 5998-6009.
Li et al. (2012) "Printable Superhydrophilic—Superhydrophobic Micropatterns Based on Supported Lipid Layers," Langmuir. 28:8286-8291.
Li et al. (Dec. 18, 2014) "Reactive superhydrophobic surface and its photoinduced disulfide-ene and thiol-ene (bio)functionalization," Nano Lett. 15:675-681.
Li et al. (Jul. 5, 2013) "Hydrophobic liquid-infused porous polymer surfaces for antibacterial applications," ACS Appl. Mater. Interfaces 5:6704-6711.
Lin et al. (2010) "Bio-inspired hierarchical macromolecule-nanoclay hydrogels for robust underwater superoleophobicity," Adv. Mater. 22:4826-4830.
Lin et al. (2011) "Endotoxin-induced structural transformations in liquid crystalline droplets," Science. 332:1297-1300.
Lipinski (2000) "Drug-like properties and the causes of poor solubility and poor permeability," Journal of Pharmacological and Toxicological Methods. 44:235-249.
Liu et al. (2008) "Ultrathin Multilayered Films that Promote the Release of Two DNA Constructs with Separate and Distinct Release Profiles," Adv. Mater. 20:4148-4153.
Liu et al. (2009) "Bioinspired Design of a Superoleophobic and Low Adhesive Water/Solid Interface," Adv. Mater. 21:665-669.
Liu et al. (2010) "Recent developments in bio-inspired special wettability," Chem. Soc. Rev. 39:3240-3255.
Liu et al. (2012) "Bioinspired oil strider floating at the oil/water interface supported by huge superoleophobic force," ACS Nano. 6:5614-5620.
Liu et al. (2012) "Bio-Inspired Self-Cleaning Surfaces," Ann. Rev. Mater. Res. 42:231-263.
Liu et al. (2012) "Clam's shell inspired high-energy inorganic coatings with underwater low adhesive superoleophobicity," Adv. Mater. 24:3401-3405.

Liu et al. (2012) "Complementary effects of nanosilver and superhydrophobic coatings on the prevention of marine bacterial adhesion," ACS Appl. Mater. Interfaces. 4:4683-4690.
Liu et al. (Jun. 17, 2013) "Organogel-based thin films for self-cleaning on various surfaces," Adv. Mater. 25:4477-4481.
Luong-Van et al. (2006) "Controlled release of heparin from poly($\varepsilon$-caprolactone) electrospun fibers," Biomaterials, 27, 2042-2050.
Lynn (2007) "Peeling Back the Layers: Controlled Erosion and Triggered Disassembly of Multilayered Polyelectrolyte Thin Films," Adv. Mater. 19:4118-4130.
Ma et al. (Feb. 11, 2014) "Substrate-Independent Underwater Superoleophobic Surfaces Inspired by Fish-Skin and Mussel-Adhesives," Adv. Mater. Interfaces. 1:1300092.
MacDonald et al. (2008) "Release of a model protein from biodegradable self assembled films for surface delivery applications," J. Control. Release. 131:228-234.
Manna et al. (2008) "Encapsulation of Uncharged Water-Insoluble Organic Substance in Polymeric Membrane Capsules via Layer-by-Layer Approach," J. Phys. Chem. B. 112:13258-13262.
Manna et al. (2012) "Chemical Patterning and Physical Refinement of Reactive Superhydrophobic Surfaces," Adv. Mater. 24:4291-4295.
Manna et al. (2013) "Liquid Crystal Chemical Sensors That Cells Can Wear", *Angewandte Chemie International Edition*, 52(52):14011.
Manna et al. (2013) "Patterning and Impregnation of Superhydrophobic Surfaces Using Aqueous Solutions," *ACS Applied Materials & Interfaces*, 5(16):7731.
Manna et al. (2013) "'Shrink-to-Fit' Superhydrophobicity Thermally-Induced Microscale Wrinkling of Thin Hydrophobic Multilayers Fabricated on Flexible Shrink-Wrap Substrates," *Advanced Materials*, 25(22):3085.
Manna et al. (Apr. 27, 2016) "Slippery liquid-infused porous surfaces that prevent microbial surface fouling and kill non-adherent pathogens in surrounding media: A controlled release approach," Advanced Functional Materials. 26(21):3599-3611.
Manna et al. (Apr. 8, 2015) "Fabrication of liquid-infused surfaces using reactive polymer multilayers: Principles for manipulating the behaviors and mobilities of aqueous fluids on slippery liquid interfaces," Adv. Mater. 27:3007-3012.
Manna et al. (Aug. 13, 2013) "Restoration of Superhydrophobicity in Crushed Polymer Films by Treatment with Water: Self-Healing and Recovery of Damaged Topographic Features Aided by an Unlikely Source," Adv. Mater. 25:5104-5108.
Manna et al. (Aug. 25, 2013) "Superhydrophobic polymer multilayers that promote the extended, long-term release of embedded water-soluble agents," Adv. Mater. 25:6405-6409.
Manna et al. (Feb. 4, 2015) "Synthetic Surfaces with Robust and Tunable Underwater Superoleophobicity," Adv. Funct. Mater. 25:1672-1681.
Mattmann et al. (2011) "Potent and selective synthetic modulators of a quorum sensing repressor in Pseudomonas aeruginosa identified from second-generation libraries of N-acylated L-homoserine lactones," ChemBioChem. 12:942-949.
Mavor et al. (2005) "Systemic fungal infections caused by Candida species: epidemiology, infection process and virulence attributes," Curr. Drug Targ. 6:863-874.
Medeiros et al. (2009) "Solution blow spinning: A new method to produce micro- and nanofibers from polymer solutions," Journal of Applied Polymer Science, 113: 2322-2330.
Mellbye et al. (Dec. 27, 2013) "Physiological framework for the regulation of quorum sensing-dependent public goods in Pseudomonas aeruginosa," J. Bacteriol. 196:1155-1164.
Moore et al. (Oct. 22, 2015) "A comparative analysis of synthetic quorum sensing modulators in Pseudomonas aeruginosa: New insights into mechanism, active efflux susceptibility, phenotypic response, and next-generation ligand design," J. Am. Chem. Soc. 137:14626-14639.
Muh et al. (2006) "Novel Pseudomonas aeruginosa quorum-sensing inhibitors identified in an ultra-high-throughput screen," Antimicrob. Agents Chemother. 50:3674-3679.
Mulhearn et al. (2012) "Facilitated transport enhances spray layer-by-layer assembly of oppositely charged nanoparticles," Soft Matter, 8: 10419-10427.

(56) References Cited

OTHER PUBLICATIONS

Ng et al. (2009) "Bacterial quorum-sensing network architectures," Annu. Rev. Genet. 43:197-222.
Nicolle (2005) "Catheter-related urinary tract infection," Drug. Aging. 22:627-639.
Nishimoto et al. (Oct. 23, 2013) "Bioinspired self-cleaning surfaces with superhydrophobicity, superoleophobicity, and superhydrophilicity," RSC Adv. 3:671-690.
Nolte et al. (2007) "Thin Film Thickness Gradients and Spatial Patterning via Salt Etching of Polyelectrolyte Multilayers", *Macromolecules*, 40(15):5479.
Nolte et al. (2008) "Effect of Relative Humidity on the Young's Modulus of Polyelectrolyte Multilayer Films and Related Nonionic Polymers", *Macromolecules*, 41(15):5793.
O'Reilly et al. (Nov. 2, 2015) "Structure-Based Design and Biological Evaluation of Triphenyl Scaffold-Based Hybrid Compounds as Hydrolytically Stable Modulators of a LuxR-Type Quorum Sensing Receptor," ACS Infect. Dis. 2:32-38.
O'Loughlin et al. (Oct. 29, 2013) "A quorum-sensing inhibitor blocks Pseudomonas aeruginosa virulence and biofilm formation," Proc. Natl. Acad. Sci. USA. 110:17981-17986.
Orner et al. (2004) "Arrays for the Combinatorial Exploration of Cell Adhesion," J. Am. Chem. Soc. 126:10808-10809.
Parker et al. (2001) "Water capture by a desert beetle," Nature. 414:33-34.
Passerini et al. (1992) "Biofilms on indwelling vascular catheters," Crit. Care Med. 20:665-673.
Peeters et al. (2008) "Comparison of multiple methods for quantification of microbial biofilms grown in microtiter plates," J. Microbiol. Meth. 72:157-165.
Peppou-Chapman et al. (May 2020) "Life and death of liquid-infused surfaces: a review on the choice, analysis and fate of the infused liquid layer," Chem. Soc. Rev., 49: 3688-3715.
Pereira et al. (May 20, 2014) "Brønsted acid catalyzed azlactone ring opening by nucleophiles," Tetrahedron. 70(20):3271-3275.
Porcel et al. (2005) "Ultrathin Coatings and (Poly(glutamic acid)/Polyallylamine) Films Deposited by Continuous and Simultaneous Spraying," Langmuir, 21: 800-802.
Quinn et al. (2007) "Next generation, sequentially assembled ultrathin films beyond electrostatics," *Chemical Society Reviews*, 36(5):707.
Ramage et al. (2005) "Candida biofilms: an update," Eukaryot. Cell. 4:633-638.
Ramage et al. (2009) "Our current understanding of fungal biofilms," Crit. Rev. Microbiol. 35:340-355.
Rasmussen et al. (1984) "Chemistry of alkenylazlactones, 2† Reaction with thiols," Makromol. Chem. Rapid Commun. 5 (2):67-70.
Rasmussen et al. (1992) "Crosslinked, hydrophilic, azlactone-functional polymeric beads a two-step approach," *Reactive Polymers*, 16(2):199 (1992).
Richardson et al. (Apr. 2015) "Technology-driven layer-by-layer assembly of nanofilms", *Science*, 348(6233):aaa2491.
Richardson et al. (Nov. 2016) "Innovation in Layer-by-Layer Assembly," Chem. Rev., 116: 14828-14867.
Rydzek et al. (2012) "Strategies for covalently reticulated polymer multilayers," *Soft Matter*, 8(38):9738.
Sánchez-Velázquez, Harshit Agarwal, and David M. Lynn (Jul. 31, 2019) "Slippery Liquid Infused Porous Surfaces (SLIPS): Building New Functionality and Developing Large Scale Fabrication Methods," Poster presented at REU poster session in the University of Wisconsin-Madison Engineering Centers Building.
Schaaf et al. (2012) "Spray-Assisted Polyelectrolyte Multilayer Buildup: from Step-by-Step to Single-Step Polyelectrolyte Film Constructions," Adv. Mater., 24: 1001-1016.
Schlenoff et al. (2000) "Sprayed Polyelectrolyte Multilayers," Langmuir, 16(26), 9968-9969.
Schmitt et al. (Feb. 15, 2016) "Peptide Conjugation to a Polymer Coating via Native Chemical Ligation of Azlactones for Cell Culture," Biomacromolecules. 17(3):1040-1047.

Schmitt et al. (May 20, 2015) "Polyethylene Glycol Coatings on Plastic Substrates for Chemically Defined Stem Cell Culture," Adv. Healthcare Mater. 4(10):1555-1564.
Schönhoff (2003) "Self-assembled polyelectrolyte multilayers," *Current Opinion in Colloid & Interface Science*, 8(1): 86.
Seon et al. (Nov. 18, 2015) "Polyelectrolyte Multilayers: A Versatile Tool for Preparing Antimicrobial Coatings," Langmuir. 31:12856-12872.
Shen et al. (2012) "Asymmetric free-standing film with multifunctional anti-bacterial and self-cleaning properties," ACS Appl. Mater. Interfaces. 4:4476-4483.
Smith et al. (2009) "Layer-by-layer platform technology for small-molecule delivery," Angew. Chem. Int. Ed. 48:8974-8977.
Smith et al. (Dec. 17, 2012) "Droplet mobility on lubricant-impregnated surfaces," Soft Matter. 9:1772-1780.
Soike et al. (2010) "Engineering a Material Surface for Drug Delivery and Imaging using Layer-by-Layer Assembly of Functionalized Nanoparticles," Adv. Mater. 22:1392-1397.
Solomon et al. (Nov. 2017) Chapter 10, Lubricant-Impregnated Surfaces, in Non-Wettable Surfaces: Theory, Preparation and Applications, The Royal Society of Chemistry, pp. 285-318.
Stacy et al. (2012) "Attenuation of quorum sensing in the pathogen Acinetobacter baumannii using non-native N-acyl homoserine lactones," ACS Chem. Biol. 7:1719-1728.
Starkey et al. (Aug. 21, 2014) "Identification of Anti-virulence Compounds That Disrupt Quorum-Sensing Regulated Acute and Persistent Pathogenicity," PLoS Pathog. 10(8):e1004321. pp. 1-17.
Subbiah et al. (2005) "Electrospinning of nanofibers," Journal of Applied Polymer Science, 96: 557-569.
Subramanyam et al. (Sep. 26, 2013) "Ice Adhesion on Lubricant-Impregnated Textured Surfaces," Langmuir. 29:13414-13418.
Sun et al. (2010) "Release of DNA from polyelectrolyte multilayers fabricated using 'charge-shifting' cationic polymers: Tunable temporal control and sequential, multi-agent release," J. Control. Release. 148:91-100.
Sunny et al. (Sep. 1, 2014) "Lubricant-infused nanoparticulate coatings assembled by layer-by-layer deposition," Adv. Funct. Mater. 24:6658-6667.
Taff et al. (2012) "Comparative analysis of Candida biofilm quantitation assays," Med. Mycology. 50:214-218.
Tang et al. (2006) "Biomedical Applications of Layer-by-Layer Assembly From Biomimetics to Tissue Engineering", *Advanced Materials*, 18(24):3203.
Tian et al. (Jul. 8, 2014) "Interfacial Material System Exhibiting Superwettability," Adv. Mater. 26:6872-6897.
Timonen eet al. (Jul. 19, 2013) "Switchable Static and Dynamic Self-Assembly of Magnetic Droplets on Superhydrophobic Surfaces," Science. 341:253-257.
Tuteja et al. (2007) "Designing superoleophobic surfaces," Science. 318:1618-1622.
Ueda et al. (Jan. 23, 2013) "Emerging applications of superhydrophilic-superhydrophobic micropatterns," Adv. Mater. 25:1234-1247.
Ueda et al. (May 28, 2013) "Micropatterning hydrophobic liquid on a porous polymer surface for long-term selective cell-repellency," Adv. Healthcare Mater. 2(11):1425-1429.
Verho et al. (2011) "Mechanically Durable Superhydrophobic Surfaces," Adv. Mater. 23:673-678.
Vogel et al. (Jul. 31, 2013) "Transparency and damage tolerance of patternable omniphobic lubricated surfaces based on inverse colloidal monolayers," Nat. Commun. 4:2176.
Wang et al. (Aug. 2015) "Bioinspired Surfaces with Superwettability New Insight on Theory, Design, and Applications," *Chemical Reviews*, 115(16):8230.
Wei et al. (Sep. 18, 2014) "Supramolecular polymers as surface coatings: Rapid fabrication of healable superhydrophobic and slippery surfaces," Adv. Mater. 26:7358-7364.
Welsh et al. (Feb. 18, 2016) "Chemical genetics reveals environment-specific roles for quorum sensing circuits in Pseudomonas aeruginosa," Cell Chem. Biol. 23:361-369.
Welsh et al. (Jan. 9, 2015) "Small molecule disruption of quorum sensing cross-regulation in Pseudomonas aeruginosa causes major and unexpected alterations to virulence phenotypes," J. Am. Chem. Soc. 137:1510-1519.

(56) References Cited

OTHER PUBLICATIONS

Wen et al. (Jan. 2015) "Bioinspired Super-Wettability from Fundamental Research to Practical Applications," *Angewandte Chemie-International Edition*, 54(11):3387.
Wenzel (1936) "Resistance of Solid Surfaces to Wetting by Water," Ind. Eng. Chem. 28:988-994.
Wong et al. (2011) "Bioinspired self-repairing slippery surfaces with pressure-stable omniphobicity," Nature. 477:443-447.
Wood et al. (2006) "Controlling interlayer diffusion to achieve sustained, multiagent delivery from layer-by-layer thin films," *Proceedings of the National Academy of Sciences*, 103(27):10207.
Xiao et al. (Mar. 2016) "Layer-by-layer assembly of versatile nanoarchitectures with diverse dimensionality a new perspective for rational construction of multilayer assemblies", *Chemical Society Reviews*, Issue 11, 45:3088-3121.
Xiao et al. (Sep. 25, 2013) "Slippery liquid-infused porous surfaces showing marine antibiofouling properties," ACS Appl. Mater. Interfaces. 5:10074-10080.
Xin et al. (2012) "Schiffs base as a stimuli-responsive linker in polymer chemistry," Polymer Chemistry. 3(11):3045-3055.
Xu et al. (May 17, 2013) "Nacre-Inspired Design of Mechanical Stable Coating with Underwater Superoleophobicity," ACS Nano. 7:5077-5083.
Xu et al. (Nov. 7, 2012) "An Ion-Induced Low-Oil-Adhesion Organic/Inorganic Hybrid Film for Stable Superoleophobicity in Seawater," Adv. Mater. 25:606-611.
Yang et al. (2004) "Mechanistic Study of the Anchoring Behavior of Liquid Crystals Supported on Metal Salts and Their Orientational Responses to Dimethyl Methylphosphonate," J. Phys. Chem. B, 108(52): 20180-20186.
Yao et al. (2011) "Applications of Bio-Inspired Special Wettable Surfaces," Adv. Mater. 23:719-734.
Yao et al. (Apr. 7, 2013) "Adaptive fluid-infused porous films with tunable transparency and wettability," Nat. Mater. 12:529-534.
Yao et al. (Dec. 17, 2013) "Temperature-Driven Switching of Water Adhesion on Organogel Surface," Adv. Mater. 26:1895-1900.
Yohe et al. (2012) "3D superhydrophobic electrospun meshes as reinforcement materials for sustained local drug delivery against colorectal cancer cells," J. Control. Release. 162:92-101.
Yohe et al. (2012) "Superhydrophobic Materials for Tunable Drug Release: Using Displacement of Air to Control Delivery Rates," J. Am. Chem. Soc. 134:2016-2019.
Yohe et al. (2013) "A Mechanistic Study of Wetting Superhydrophobic Porous 3D Meshes," Adv. Funct. Mater. 23:3628-3637.
You et al. (Sep. 4, 2014) "Fabrication of a Micro-omnifluidic Device by Omniphilic/Omniphobic Patterning on Nanostructured Surfaces," ACS Nano. 8:9016-9024.
Yuan et al. (2008) "Superwetting nanowire membranes for selective absorption," Nat. Nanotechnol. 3:332-336.
Yuan et al. (Aug. 2020) "Weak polyelectrolyte-based multilayers via layer-by-layer assembly: Approaches, properties, and applications," Adv. Colloid Interface Sci., 282: 102200.
Zacharia et al. (2007) "Controlling Diffusion and Exchange in Layer-by-Layer Assemblies," *Macromolecules*, 40(5):1598.
Zacharia et al. (2007) "Factors Influencing the Interdiffusion of Weak Polycations in Multilayers," *Macromolecules*, 40(26):9523.
Zelikin (2010) "Drug Releasing Polymer Thin Films: New Era of Surface-Mediated Drug Delivery," ACS Nano. 4:2494-2509.
Zhai et al. (2004) "Stable Superhydrophobic Coatings from Polyelectrolyte Multilayers," Nano Lett. 4:1349-1353.
Zhai et al. (2006) "Patterned Superhydrophobic Surfaces: Toward a Synthetic Mimic of the Namib Desert Beetle," Nano Lett. 6:1213-1217.
Zhang et al. (2006) "Erosion of multilayered films fabricated from degradable polyamines: Characterization and evidence in support of a mechanism that involves polymer hydrolysis," J Polym Sci Part A: Polym Chem, 44: 5161-5173.
Zhang et al. (2007) "Layer-by-layer assembly: from conventional to unconventional methods," Chem. Commun., 1395-1405.
Zhang et al. (Feb. 18, 2013) "Superhydrophobic and Superoleophilic PVDF Membranes for Effective Separation of Water-in-Oil Emulsions with High Flux," Adv. Mater. 25:2071-2076.
Zhang et al. (Oct. 2, 2013) "Nepenthes Pitcher Inspired Anti-Wetting Silicone Nanofilaments Coatings: Preparation, Unique Anti-Wetting and Self-Cleaning Behaviors," Adv. Funct. Mater. 24:1074-1080.

\* cited by examiner

SLIPPERY LIQUID-INFUSED POROUS SURFACES THAT RELEASE HYDROPHILIC AND HYDROPHOBIC AGENTS

CROSS-REFERENCE TO RELATED APPLICATIONS

This application claims priority from U.S. Provisional Patent Application No. 63/059,028, filed Jul. 30, 2021, which is incorporated by reference herein to the extent that there is no inconsistency with the present disclosure.

STATEMENT REGARDING FEDERALLY SPONSORED RESEARCH OR DEVELOPMENT

This invention was made with government support under DMR1720415 awarded by the National Science Foundation. The government has certain rights in the invention.

BACKGROUND OF THE INVENTION

The present invention relates to materials that have surface coatings containing emulsions able to release active agents, including hydrophilic agents, into the surrounding environment. These materials have improved anti-fouling behaviors compared to many other existing types of anti-fouling surfaces.

Synthetic surfaces that are resistant to fouling by aqueous media, organic fluids, or biological organisms are critical in a broad range of industrial, commercial, and biomedical contexts. Surfaces that are superhydrophobic, superoleophobic, or superomniphobic, for example, form a basis for the design of self-cleaning and antifogging materials, anti-corrosive interfaces, and stain-resistant textiles, and have enabled new strategies for the transport and manipulation of complex fluids, including approaches to oil recovery and oil/water separation (see Liu et al., Chem. Soc. Rev. 2010, 39, 3240; Banerjee et al., Adv. Mater. 2011, 23, 690; Yao et al., Adv. Mater. 2011, 23, 719; Liu et al., Ann. Rev. Mater. Res. 2012, 42, 231; Campoccia et al., Biomaterials 2013, 34, 8533; Ueda et al., Adv. Mater. 2013, 25, 1234; Bellanger et al., Chem. Rev. 2014, 114, 2694; Genzer et al., Science 2000, 290, 2130; Tuteja et al., Science 2007, 318, 1618; Chu et al., Chem. Soc. Rev. 2014, 43, 2784; and Deng et al., Science 2012, 335, 67).

For example, slippery liquid-infused porous surfaces (SLIPS) are a class of synthetic materials that exhibit unique and robust antifouling behavior (see U.S. Pat. Nos. 8,071,210, 10,487,217, 10,557,042, and 10,557,044). These materials are generally fabricated by infusion of viscous oils into porous surfaces, yielding interfaces that allow other fluids to slide off with sliding angles sometimes as low as 2°. This slippery behavior arises from an ability to host and maintain thin films of oil at their surfaces, placing a premium on chemical compatibility between the matrix and the oil and revealing design criteria that can be exploited to manipulate the behaviors of contacting fluids (e.g., to tune sliding angles and velocities or create responsive surfaces that allow control over these and other interfacial behaviors). Surfaces and materials that exhibit these characteristics have enabled the design of new anti-icing surfaces, slippery containers for the dispensing of commercial liquids and gels, and new liquid-infused interfaces that are resistant to biofouling in complex aqueous, biological, and marine environments.

Recent reports on alternative approaches to the development of SLIPS have enabled the design of new classes of synthetic and highly 'slippery' anti-fouling materials that address practical limitations exhibited by conventional non-wetting (e.g., superhydrophobic) surfaces, and introduce new principles for the design of robust, injury-tolerant, and mechanically compliant synthetic anti-fouling surfaces (see Wong et al., Nature 2011, 477, 443; Grinthal et al., Chem. Mater. 2014, 26, 698; Epstein et al., Proc. Natl. Acad. Sci. U.S.A. 2012, 109, 13182; Yao et al., Nat. Mater. 2013, 12, 529; Liu et al., Adv. Mater. 2013, 25, 4477; Smith et al., Soft Matter 2013, 9, 1772; Vogel et al., Nat. Commun. 2013, 4; Huang et al., ACS Macro Lett. 2013, 2, 826; Leslie et al., Nat. Biotechnol. 2014, 32, 1134; Glavan et al., Adv. Funct. Mater. 2014, 24, 60; Wei et al., Adv. Mater. 2014, 26, 7358; Yao et al., Adv. Mater. 2014, 26, 1895; and Zhang et al., Adv. Funct. Mater. 2014, 24, 1074.)

Previous reports demonstrate that SLIPS can be designed to resist fouling by bacteria and other marine organisms that can colonize and form biofilms on biomedical devices or commercial and industrial equipment (see Epstein et al., Proc. Natl. Acad. Sci. U.S.A. 2012, 109, 13182; Leslie et al., Nat. Biotechnol. 2014, 32, 1134; Howell et al., ACS Appl. Mater. Inter. 2014, 6, 13299; Li et al., ACS Appl. Mater. Inter. 2013, 5, 6704; and Xiao et al., ACS Appl. Mater. Inter. 2013, 5, 10074). Those studies suggest that appropriately designed liquid-infused surfaces can resist the attachment, colonization, and organization of communities of these organisms in ways that exceed those exhibited by some conventional anti-fouling surfaces (such as surfaces modified with polyethylene glycol and non-wetting superhydrophobic surfaces, etc.), even in complex media with proteins, surfactants, or at high ionic strengths typical of environmental conditions encountered in many applied and biologically relevant contexts.

Additionally, SLIPS can be loaded with active agents, where the active agents are able to be controllably released into surrounding environments over time, either to further enhance anti-fouling properties or to impart other useful functions (see U.S. Pat. No. 10,557,042). However, because those past approaches involve the design of SLIPS using hydrophobic liquids (e.g., oils), the utility of those approaches has been limited to the loading and release of hydrophobic agents that have at least some appreciable solubility in hydrophobic liquids. It is generally very difficult or not feasible to use such methods to load and release hydrophilic agents, including small molecule drugs, proteins, peptides, and nucleic acids, that are not appreciably soluble in liquid oil phases.

Accordingly, what is needed are materials and methods that enable a wider range of active agents, especially hydrophilic agents, to be loaded and controllably released from slippery anti-fouling surfaces and similar materials, thus greatly expanding the types of agents that can be used in such materials and the range of potential functionalities that can be imparted.

SUMMARY OF THE INVENTION

The present invention provides materials and methods of making materials, where at least one surface of the material utilizes an emulsion to controllably release desired molecules into the surrounding environment. Preferably, the materials are 'slippery' in that liquid droplets and other compounds, such as aqueous fluids, organic compounds and microorganisms, are able to easily slide off the surface without adhering to the surface.

One embodiment of the present invention provides a material able to controllably release molecules into a surrounding environment, wherein the material comprises: a) a porous matrix; b) an emulsion covering at least a portion of the porous matrix, the emulsion comprising a liquid continuous phase and a plurality of liquid droplets dispersed within the continuous phase, and c) one or more molecules dispersed within the plurality of liquid droplets. In an embodiment, the surrounding environment is a liquid environment, such as a liquid medium. Alternatively, the surrounding environment can be a gas medium, such as air. Preferably, the surrounding environment is an aqueous liquid. The emulsion at least partially fills the pores of the porous matrix, and the material is able to controllably release the one or more molecules into the surrounding environment, such as when the material is immersed into a liquid medium. In an embodiment, the porous matrix has nanoscale, microscale, or macroscale porosity. Preferably, the porous matrix has macroscale porosity.

In an embodiment, the continuous phase of the emulsion is hydrophobic and the droplets of the dispersed phase comprise water or a hydrophilic liquid. For example, the emulsion may be a water-in-oil emulsion. Alternatively, the continuous phase may be hydrophilic and the dispersed droplets are hydrophobic, such as in an oil-in-water emulsion. In an embodiment, the plurality of liquid droplets comprise water or other aqueous solutions. In an embodiment, the continuous phase comprises a natural or synthetic oil, preferably selected from the group consisting of a hydrocarbon-based oil, a silicone oil, a vegetable oil, a mineral oil, a perfluorinated oil, a thermotropic liquid crystal, and combinations thereof. Preferably, the continuous phase comprises a hydrocarbon-based oil, including but not limited to hexadecane.

In general, the one or more molecules to be released by the material into the surrounding environment are at least partially contained in the liquid droplets of the dispersed phase of the emulsion. Accordingly, the liquid droplets should have an average diameter large enough to encompass the desired molecules to be released from the material. Preferably, the emulsion is a nanoemulsion or macroemulsion where the liquid droplets of the dispersed phase have an average diameter between 10 nm and 100 µm, between 50 nm and 5 µm, between 50 nm and 1 µm, between 100 nm and 900 nm, between 100 nm and 500 nm, between 100 nm and 200 nm, between 200 nm and 800 nm, or between 200 nm and 500 nm.

The molecules dispersed within the plurality of liquid droplets can be any molecule having a desired function when released into the surrounding environment, and can include hydrophobic, hydrophilic and amphiphilic molecules. In an embodiment, the molecules released by the materials of the present invention comprise hydrophilic molecules. In an embodiment, the molecules to be released by the materials comprise hydrophobic molecules.

The materials preferably also comprise one or more surfactants to help form or maintain the emulsion. In an embodiment, the one or more surfactants comprise sorbitan monooleate (span 80), polyoxyethylene sorbitan monooleate (polysorbate 80), or combinations thereof.

In an embodiment, the surrounding medium is an aqueous medium where the surface may encounter fungi, bacteria, and/or other microorganisms. Types of surrounding media include, but are not limited to, salt water environments (such as sea water or saline solutions), fresh water environments (such as swamp water or fresh lake water), and physiological or physiologically relevant media (including but not limited to phosphate-buffered saline solutions, TRIS-buffered saline solutions, HEPES-buffered saline solutions, Ringer's solution, cell culture media as known in the art, blood or blood plasma, and other bodily fluids). Preferably, the surrounding media does not promote the degradation of the emulsion, or does so at a slow rate.

The ability to store and control the release of molecules or other active agents from the emulsion allows for a wide range of applications for these emulsion-infused materials. Preferably, the one or more molecules to be released are loaded into the emulsion without compromising the 'slippery' characteristic of the material, thereby providing new approaches to the design of multi-functional or dual-action materials with improved antimicrobial properties. Provided that the embedded molecules can diffuse into the continuous phase and/or into the surrounding environment, the present invention offers opportunities to design anti-fouling materials that kill or influence the behaviors of planktonic microorganisms.

In one aspect of the invention, the materials are able to sustain the release of molecules, including hydrophobic, hydrophilic and/or amphiphilic molecules able to prevent adhesion and colonization by fungal and bacterial pathogens. These molecules may further be able to kill and/or attenuate the colonization and virulence of non-adherent pathogens in surrounding media. For example, the surface emulsion may promote the sustained release of broad-spectrum antimicrobial agents, antifungal agents, antibacterial agents, agents that modulate bacterial or fungal quorum sensing, agents that attenuate virulence, or combinations thereof.

Preferably, the one or more molecules dispersed within the plurality of liquid droplets and which are released by the material, are able to reduce, inhibit, or modulate the behaviors of non-adherent pathogens in the surrounding media. As non-limiting examples, the molecules to be released kill or otherwise reduce at least a portion of the pathogens, slow reproduction or growth of least a portion of pathogens, or modulate behavior such as preventing or reducing the ability of pathogens to communicate with each other. In an embodiment, the molecules to be released comprise natural or synthetic antibiotic agents, natural or synthetic antifungal agents, quorum sensing modulators, or combinations thereof.

In an embodiment, the one or more molecules to be released comprise proteins, peptides, saccharides, nucleic acids, plasmid DNA, biologics, small molecules, or combinations thereof. In an embodiment, the molecules to be released comprise one or more anti-microbial peptides having a molecular weight of 900 daltons or less.

Optionally, the molecules to be released are of any size, and are preferably hydrophilic. However, in an embodiment, the one or more molecules released by the materials of the present invention comprise one or more small-molecule compounds. As used herein, "small molecules" and "small-molecule compounds" refer to compounds having a molecular weight of approximately 900 daltons or less, preferably approximately 700 daltons or less, preferably approximately 500 daltons or less, or preferably approximately 300 daltons or less.

It is understood that the chemical structure of the molecules to be released will influence the solubility in the continuous phase and dispersed phase, as well interactions between the molecules and the polymer matrix in ways that will influence, and which can be used to modulate, the release profile into the surrounding media. In an embodiment, the molecule to be released is soluble to very soluble in water (at least 3.3 g/100 g $H_2O$). In an embodiment, the molecule to be released is sparingly soluble in water (0.1 to 3.3 g/100 g $H_2O$). In an embodiment, the molecule to be released is slightly soluble in water (0.01 to 0.1 g/100 g H$_2$O). In an embodiment, the molecule to be released is practically insoluble in water (less than 0.01 g/100 g H$_2$O). In an embodiment, the molecule to be released has drug-like characteristics such as good absorption, distribution, metabolism, excretion and toxicity (ADMET) profiles as known in the art (see, for example, Lipinski, Journal of Pharmacological and Toxicological Methods 2000, 44: 235-249).

Preferably, the one or more molecules to be released are able to reduce, inhibit, or modulate fungal and bacterial pathogens including, but not limited to, *Candida* species, *Aspergillus* species, *Cryptococcus* species, *Histoplasma* species, *Helicobacter* species, *Neisseria* species, *Pneumocystis* species, *Stachybotrys* species, *Pseudomonas* species, *Escherichia* species, *Streptococcus* species and *Staphylococcus* species.

In further embodiments, the one or more molecules to be released comprise compounds selected from the group consisting of acyl L-homoserine lactone (AHL) derivatives, aminobenzimidazole (ABI) derivatives, and combinations thereof. Classes of useful small-molecule drugs are modulators and particularly antagonists of bacterial quorum sensing. Many such small-molecule modulators are known in the art and several exemplary quorum sensing modulators are illustrated below. Eibergen et al., ChemBioChem 2015, 16:2348-2356, reports among others certain classes of quorum sensing antagonists designated PHL's and POHL's therein as exemplified by compounds A and B shown below. Moore et al., J. Amer. Chem. Soc. 2015, 137:14626-14639 reports among others AHL mimics which are quorum sensing antagonists such as compound C and certain non-AHL modulators such as compound D (shown below). O'Reilly et al., ACS Infect. Dis. 2016, 2:32-38, for example, reports among others hydrolytically stable LasR antagonists such as compounds E and F (shown below). Starkey et al., PLoS Pathog. 2014, 10, e100432,1 report compounds that disrupt quorum sensing such as compound G (shown below). Frei et al., Angewandte Chemie 2012, 124:5316-5319 report 2-aminobenzimidazoles, such as compound H (shown below), which inhibit and disperse biofilms. Each of these references is incorporated by reference herein in its entirety for descriptions of quorum sensing modulators, particularly antagonists of quorum sensing, including descriptions of their preparation and their activities. U.S. Pat. Nos. 8,815,943; 8,624,063; 8,367,680; 8,269,024; 7,910,622; and 7,642,285 relate to small molecule quorum sensing modulators useful in the methods of the present invention.

In further embodiments, the molecules to be released comprise compounds selected from the group consisting of:

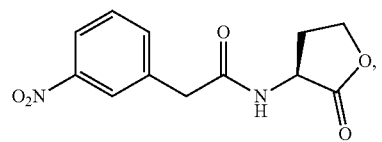

A

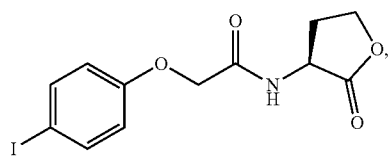

B

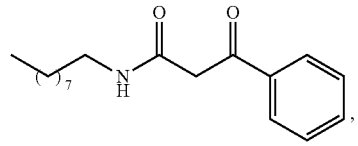

C

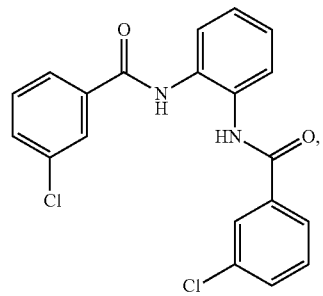

D

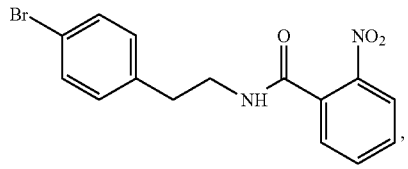

E

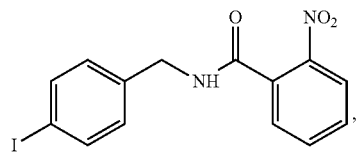

F

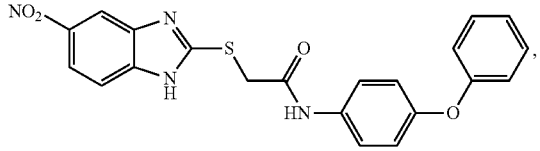

G

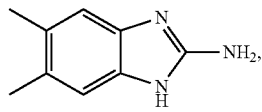

H

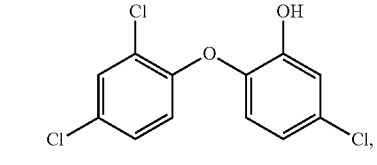

I

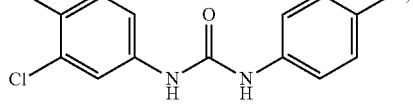

J or combinations thereof.

The porous matrices used in the materials of the present invention are macroporous, microporous or nanoporous. Preferably, the porous matrix comprises a plurality of pores having a pore size from 100 nm to 50 µm, 100 nm to 5,000 nm, 100 nm to 1,000 nm, 200 nm to 1,000 nm, 200 nm to 950 nm, or 500 nm to 950 nm.

In an embodiment, the porous matrix is a polymer-based multilayer film. For example, porous matrix may comprise a multilayer film having two or more layers comprising a first polymer in contact with a second polymer, and where the multilayer film has nanoscale or microscale porosity. In an alternative embodiment, the porous matrix is not a multilayer film and may be any porous material that is chemically compatible with the emulsion and one or more molecules to be released into the surrounding environment. For example, in an embodiment, the porous matrix is microporous polytetrafluoroethylene (PTFE) (Teflon™), a fiber mat (preferably where the fibers are in the micron scale or nanoscale range), or a nanofiber mesh (including but not limited to nanofibers formed by electrospinning or blow spinning). In a further embodiment, the material comprises a microporous PTFE matrix, a nanoemulsion having a continuous phase comprising a hydrocarbon-based oil, preferably hexadecane, and a dispersed phase comprising water droplets, and one or more hydrophilic molecules dispersed within the plurality of liquid droplets.

In an embodiment, the porous matrix is based on slippery liquid-infused porous surfaces (SLIPS) fabricated by the infusion of an emulsion comprising a hydrophobic liquid oil into microporous or nanoporous polymer multilayers fabricated by reactive/covalent layer-by-layer assembly, such as described in Manna et al., Adv. Mater. 2015, 27, 3007; Buck et al., Adv. Mater. 2007, 19, 3951; Buck et al., Polym. Chem. 2012, 3, 66; and Manna et al., Adv. Funct. Mater. 2015, 25, 1672. These polymer-based SLIPS can substantially prevent surface fouling, including biofilm formation, by several types of common fungal and bacterial human pathogens. Furthermore, biofilm formation on SLIPS-coated surfaces of planar objects and polymer-based catheter tubes can be reduced further by using porous polymer matrices loaded with one or more antifungal or antibacterial agents, such as triclosan, a model broad-spectrum antimicrobial agent. Materials fabricated by infusing a macroemulsion or nanoemulsion into a microporous or nanoporous matrix, such as a multilayer film, are referred herein to as slippery nanoemulsion-infused porous surfaces (SNIPS).

In an embodiment, the present invention provides a multilayer film comprising one or more layers infused with the emulsion, wherein each layer comprises an optionally functionalized first polymer in contact with a second polymer, and wherein the multilayer film has a nanoscale or microscale porosity. Preferably, the multilayer film has nanoscale porosity. The infusion of the emulsion into at least a portion of the rough or porous surfaces of the multilayer film causes other liquids placed in contact with the multilayer film to slide off the multilayer film or a surface coated with the multilayer film. Additionally, the multilayer film comprises one or more hydrophilic molecules able to be controllably released from the multilayer film into the surrounding media.

In an embodiment, the present invention provides a method for fabricating materials as described above comprising the steps of: a) providing a porous matrix, wherein the porous matrix has macroscale, nanoscale or microscale porosity; and b) exposing the porous matrix to a macroemulsion or nanoemulsion, where the macroemulsion or nanoemulsion comprises a liquid continuous phase and a plurality of liquid droplets dispersed within the continuous phase, where the plurality of liquid droplets contain one or more desired molecules, and where the macroemulsion or nanoemulsion at least partially fills the pores of the porous matrix. The method may further comprise the step of forming the macroemulsion or nanoemulsion prior to step b), where the plurality of liquid droplets in the macroemulsion or nanoemulsion are formed from a liquid, preferably an aqueous liquid, containing the one or more molecules, so that the one or more molecules are present in the plurality of liquid droplets. Preferably, the fabricated materials are able to reduce, inhibit, or modulate the behaviors of non-adherent pathogens in surrounding media. The method may further comprise the step of adding one or more surfactants to the emulsion.

In an embodiment, the porous matrix is a fiber mat or mesh where the fibers are in the micron scale or, preferably, in the nanoscale range. The fiber mats or meshes are able to be fabricated using any method known in the art, including electrospinning, blows pinning, melt spinning, dry spinning, wet spinning and gel spinning.

In an embodiment, providing a porous matrix comprises electrospinning or blow spinning a nanofiber-based mesh or fiber mat. Electrospinning is a method for producing ultrafine fibers by charging and ejecting a polymer melt or solution through a spinneret under a high-voltage electric field, followed by solidifying or coagulating to form a filament (see, for example, Bhardwaj et al., Biotechnology Advances 2010, 28(3): 325-347; and Subbiah et al., Journal of Applied Polymer Science 2005, 96: 557-569). Blow spinning is a method for producing ultrafine fibers using an apparatus having concentric nozzles, where a polymer solution is ejected through an inner nozzle while a constant, high velocity gas flow is sustained through the outer nozzle (see, for example, Medeiros et al., Journal of Applied Polymer Science 2009, 113: 2322-2330; and Daristotle et al., ACS Appl. Mater. Interfaces 2016, 8(51): 34951-34963). This allows the solvent component to evaporate and deposit strands of the polymer. Preferably, the filaments formed by electrospinning and blow spinning are in the micron scale range, more preferably in the nanometer scale range.

In a further embodiment, additional amounts of the one or more molecules are loaded into the emulsion when levels of the one or more molecules drop below a desired level, such as from prolonged use of the material. Preferably, when levels of the one or more molecules drop below a desired level, the porous matrix is exposed to an additional macroemulsion or nanoemulsion containing additional amounts of the one or more molecules. The newly added one or more molecules can be the same or different than the original small-molecule compounds. For example, a different antifungal or anti-bacterial compound can be added to the material using the additional macroemulsion or nanoemulsion depending on which pathogens are currently present in the surrounding media. In an embodiment, the porous matrix is in fluid communication with a reservoir containing additional amounts of the emulsion, one or more molecules, or both. When the amount of emulsion or one or more molecules at the surface of the material is depleted, additional amounts of the emulsion can be supplied from the reservoir. Alternatively, the additional macroemulsion or nanoemulsion can be added by depositing the additional macroemulsion or nanoemulsion to the top surface of the porous matrix.

Optionally, the liquid continuous phase is an oil and the plurality of liquid droplets comprise water. In a further embodiment, forming the macroemulsion or nanoemulsion further comprises the steps of: i) forming an oil-in-water emulsion, ii) adding additional amounts of the oil to the oil-water-emulsion, and iii) mixing the oil-in-water emulsion with the additional amounts of the oil to cause an emulsion inversion and form a water-in-oil macroemulsion or nanoemulsion. Preferably, the one or more molecules are added to the aqueous liquid forming the oil-in-water emulsion so that the liquid droplets in the formed water-in-oil emulsion contain the desired one or more molecules.

In another embodiment, the material comprises a slippery liquid-infused porous surface (SLIPS) multilayer film able to reduce or inhibit non-adherent pathogens in surrounding media, where the multilayer film comprises one or more layers. The method comprises the steps of: exposing a surface of the substrate to a first solution comprising a first polymer wherein the first polymer is deposited on at least a portion of the substrate; and exposing the substrate to a second solution comprising a second polymer wherein the second polymer reacts with the first polymer and the second polymer is deposited on at least a portion of the first polymer. This process is performed one or more times to form the multilayer film. The macroemulsion or nanoemulsion coats at least a portion of the multilayer film and least partially fills the pores of at least a portion of said multilayer film.

Preferably, the first and second polymer solution are repeatedly added one or more times until the multilayer film reaches the desired thickness or desired number of layers before the substrate is exposed to the emulsion, where each cycle deposits a new layer on the substrate. In specific embodiments, the multilayer polymer film comprises more than two layers. In a further embodiment, steps a) and b) are repeated 2 or more times, 5 or more times, 10 or more times, 20 or more times, 30 or more times, 50 or more times, or 100 or more times. The substrate can be exposed to the solutions containing the polymer solutions using methods known in the art, including but not limited to, dip coating and spraying techniques.

The fabrication method relating to the multilayer film optionally comprises a rinsing step comprising exposing or washing the substrate with a rinse solvent or solution each time the first polymer solution is added and each time step the second polymer solution is added. In an embodiment, a fresh rinse solvent or solution is employed for each rinsing step. In a further embodiment, the same rinse solution is re-used for each rinsing step.

The substrate can be any material able to support the formation of the nanoporous or microporous porous matrix, including but not limited to glass, metals and plastics. The substrate can include curved and irregularly shaped three dimensional surfaces, as well as completely solid surfaces and mesh surfaces (e.g., having a porosity between 100 µm and 250 µm). For example, the substrate can be the interior of a tube or container for a liquid or gel where it is undesirable for the contents of the tube or container to stick or adhere to the surface, such as a packaging material or the surface of a container meant to contain foods or other consumer products. Other examples include medical devices used to transport a substance to or from a patient's body. The porous matrix, first polymer, second polymer, and emulsion are therefore selected so that the liquid or gel has reduced adhesion to the container. Alternatively, the substrate can be a display of a sensor where the degree or extent to which a liquid adheres to the substrate indicates the presence of a substance in the liquid.

A further embodiment of the invention provides for patterning the substrate so that the multilayer film is formed on a first specified portion of the substrate, thereby creating a substrate having one or more "slippery" regions and one or more "sticky" regions. A portion of the multilayer film on the first specified portion of the substrate is further functionalized with an amine or hydroxyl group having the formula R—$NH_2$ or R—OH, where R is hydrophobic. In a further embodiment, a second specified portion of the substrate is not covered by the emulsion infused porous matrix, or, alternatively, a portion of the one or more layers on the second specified portion of the substrate is further functionalized with an amine or hydroxyl group having the formula R—$NH_2$ or R—OH, where R is hydrophilic.

Additionally, in a further embodiment, a portion of the one or more layers on the first specified portion of the substrate is further functionalized with an amine or hydroxyl group having the formula R—$NH_2$ or R—OH, where R is hydrophobic, a second specified portion of the substrate is not covered by the emulsion infused multilayer film, and a third portion of the substrate is covered by a layer where a portion of the one or more layers on the third specified portion of the substrate is further functionalized with an amine or hydroxyl group having the formula R—$NH_2$ or R—OH, where R is hydrophilic.

The first and second polymers can comprise any polymers or combination of polymers able to form stable multilayer films and where the first polymer is optionally able to be functionalized and the second polymer is optionally also able to be functionalized (as described in U.S. Pat. No. 8,071,210). The chemical reactivity of the functionalized polymers provides means to tune interactions between the matrix and infused emulsion phases. Spatial control over the functionalization can be used to create SLIPS with regions devoid of emulsion that can prevent or arrest the sliding of aqueous fluids, extract samples of liquid from contacting media, or provide control over the trajectories of sliding droplets. Preferably, the first polymer is covalently cross-linked with the second polymer. In further embodiments, the polymers are reacted with small chemical groups containing a hydrophobic or hydrophilic amine to further functionalize the polymers (i.e., to install secondary surface functionality).

In an embodiment, materials useful for generating porous meshes useful for the infusion of emulsions in the present invention include homopolymers and copolymers of natural and synthetic monomers. Preferably, the polymer or copolymer is hydrophobic, such that it is chemically compatible with and can promote the stable infusion and retention of liquid oil or a water-in-oil emulsion. In certain embodiments the polymer or polymers are degradable, including but not limited to degradable polyesters, degradable polyanhydrides, degradable polyorthoesters, hydrolytically degradable polymers, and combinations thereof. Examples of materials that are useful for the invention include, but are not limited, to homopolymers and copolymers comprising polcaprolactone, polylactic acid, poly glycolic acid, poly(lactic-co-glycolic acid), and combinations thereof.

Alternatively, the polymer or polymers are non-degradable or not readily degradable, including but not limited to non-degradable polyamides, polyesters, polyvinyls, polycarbonates, polyanhydrides, polyorthoesters, polyurethanes, polyacrylates, polyketones, polyacetals, and combinations thereof. Additional examples of materials that are useful for the invention include, but are not limited, to homopolymers and copolymers comprising polyvinyl chloride (PVC), polycarbonate, polytetrafluoroethylene (PTFE), poly(methyl methacrylate), PDMS, polystyrene (PS), polyvinylidene difluoride (PVDF), polyethylene, polybutadiene and combinations thereof.

In an embodiment, the first polymer comprises a functionalized azlactone having the formula:

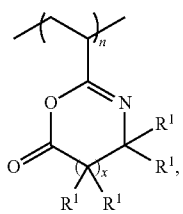

wherein x is 0 or the integers 1 or 2; and each $R^1$ is independently selected from the group consisting of: hydrogen, alkyl groups, alkenyl groups, alkynyl groups, carbocyclic groups, heterocyclic groups, aryl groups, heteroaryl groups, alkoxy groups, aldehyde groups, ether groups, and ester groups, any of which may be substituted or unsubstituted. In an embodiment, the first polymer comprises functionalized poly(vinyl-4,4-dimethylazlactone) (PVDMA). In an embodiment, the first polymer consists of functionalized poly(vinyl-4,4-dimethylazlactone) (PVDMA). In a further embodiment, the PVDMA is synthesized by free-radical polymerization of PVDMA with intentionally added cyclic azlactone-functionalized oligomer in an amount ranging from 1 wt % to 10 wt %, preferably between 5 wt % and 8 wt %.

Useful functionalized azlactone polymers include, but are not limited to, poly(vinyl-4,4-dimethylazlactone), poly(2-vinyl-4,4-dimethyl-2-oxazolin-5-one), poly(2-isopropenyl-4,4-dimethyl-2-oxazolin-5-one), poly(2-vinyl-4,4-diethyl-2-oxazolin-5-one), poly(2-vinyl-4-ethyl-4-methyl-2-oxazolin-5-one), poly(2-vinyl-4-dodecyl-4-methyl-2-oxazolin-5-one), poly(2-vinyl-4,4-pentamethylene-2-oxazolin-5-one), poly (2-vinyl-4-methyl-4-phenyl-2-oxazolin-5-one), poly(2-isopropenyl-4-benzyl-4-methyl-2-oxazolin-5-one), or poly (2-vinyl-4,4-dimethyl-1,3-oxazin-6-one). Useful azlactone functionalized polymers further include azlactone functionalized polyisoprenes and azlactone functionalized polybutadienes.

In an embodiment, the second polymer is optionally functionalized and comprises an amine functionalized polymer, an alcohol functionalized polymer, or a thiol functionalized polymer. Creating specific functionalities with amine, alcohol, and thiol groups is a process well known in the art (for example, see *Bioconjugate Techniques, 2nd Edition*, 2008, Greg T. Hermanson). In embodiments, the second polymer comprises an optionally functionalized polymer selected from the group consisting of poly(ethylene imine) (PEI), polylysine, pollyallylamine, poly(amidoamine) dendrimers, polyvinyl alcohol, poly hydroxyl ethyl methacrylate, poly(methacrylic acid) functionalized with crystamine, and linear and hyperbranched and dendritic polymers functionalized with primary amines, hydroxyl groups, or thiol groups.

In embodiments, the second polymer comprises a polymer, which is optionally functionalized, selected from the group consisting of polyolefins, poly(alkyls), poly(alkenyls), poly(ethers), poly(esters), poly(imides), polyamides, poly(aryls), poly(heterocycles), poly(ethylene imines), poly (urethanes), poly(α,β-unsaturated carboxylic acids), poly(α, β-unsaturated carboxylic acid derivatives), poly(vinyl esters of carboxylic acids), poly(vinyl halides), poly(vinyl alkyl ethers), poly(N-vinyl compounds), poly(vinyl ketones), poly (vinyl aldehydes) and any combination thereof. In an embodiment, the second polymer comprises poly(ethylene imine) (PEI).

For some embodiments, it may be desirable to further functionalize a portion of the film formed by the polymers. This can be achieved, for example, by reacting a portion of any residual functional groups in the polymers with an amine group or hydroxyl group, or by reacting a portion of the first or second polymer with an amine reactive group or hydroxyl reactive group.

In an embodiment, at least a portion of the residual functional groups in the polymers is reacted with an amine or hydroxyl group having the formula R—$NH_2$ or R—OH, where R is hydrophobic or hydrophilic. In embodiments, R is a substituted or unsubstituted $C_1$ to $C_{20}$ alkyl group, preferably a $C_1$ to $C_{12}$ alkyl group. In other embodiments, R is a substituted or unsubstituted $C_2$ to $C_{20}$ alkenyl group, preferably a $C_2$ to $C_{12}$ alkenyl group. In further embodiments, at least a portion of the residual functional groups in the polymers is reacted with an amine selected from the group consisting of methylamine, ethylamine, propylamine, butylamine, pentylamine, hexylamine, heptylamine, octylamine, nonylamine, decylamine, and combinations thereof, preferably n-propylamine, n-octylamine, or n-decylamine. In other embodiments, R is an alkyl group substituted with one or more hydroxyl groups or charged groups such as $COO^-$ or $NR3^+$. In an embodiment, at least a portion of the residual functional groups in the polymers is reacted with an amino sugar, amino alcohol, amino polyol, glucamine (preferably D-glucamine), dimethylaminopropylamine (DMAPA), and combinations thereof.

In an embodiment, the first polymer is further functionalized with a hydrophobic (such as decylamine or propylamine) or hydrophilic (such as glucamine) primary amine-containing small molecule.

As used herein, a liquid hydrophobic phase (either the continuous phase or dispersed phase) refers to any water-immiscible phase, preferably a non-polar, hydrophobic chemical substance which is a liquid at ambient temperature and which has no or very low solubility in water (e.g., an oil). The liquid hydrophobic phase can be a synthetic oil or a natural oil, and is preferably a biocompatible oil. Preferably, the oil is selected from the group consisting of a hydrocarbon-based oil, a silicone oil, a vegetable oil, a mineral oil, a perfluorinated oil, a thermotropic liquid crystal, and combinations thereof. Suitable vegetable oils include, but are not limited to, canola oil, coconut oil, olive oil, soybean oil, cannabidiol (CBD) oil, and combinations thereof. Suitable hydrocarbon-based oils include, but are not limited to hexadecane. In some embodiments, silicone oil is selected due to improved solubility with the one or more small-molecule compounds.

A specific embodiment of the present invention provides a SLIPS design based on the infusion of emulsions into nanoporous or microporous (preferably nanoporous) polymer coatings fabricated by reactive layer-by-layer assembly of polymer multilayers using branched poly(ethylene imine) (PEI) and the amine-reactive polymer poly(vinyl-4,4-dimethylazlactone) (PVDMA). In an embodiment, the multilayer film comprises one or more PVDMA/PEI bilayers, which are further functionalized with a decyl group by reacting with n-decylamine and wherein the one or more bilayers are infused with an emulsion.

One aspect of the invention provides thin multilayer polymer films and coatings (e.g., equal to or less than 100 μm, equal to or less than 50 μm, preferably less than or equal to 10 μm, preferably less than or equal to 5 μm). Preferably, the multilayer film comprises 2 or more layers, 5 or more layers, 10 or more layers, 20 or more layers, 30 or more layers, 50 or more layers, or 100 or more layers. Preferably the first polymer forms one or more first polymer layers that alternate with one or more second polymer layers. In embodiments, the multilayer films have a nanoscale or microscale porosity. Preferably, the multilayer films have nanoscale porosity.

In an embodiment, the present invention provides a method for reducing, inhibiting, or modulating the behaviors of non-adherent pathogens in media surrounding a substrate comprising the steps of: a) providing a material on the substrate, said material comprising:

i) a porous matrix;

ii) an emulsion covering at least a portion of the porous matrix, said emulsion comprising a liquid continuous phase and a plurality of liquid droplets dispersed within the continuous phase, wherein said emulsion at least partially fills the pores of the porous matrix; and iii) one or more molecules dispersed within the plurality of liquid droplets, wherein said one or more molecules are able to reduce, inhibit, or modulate the behaviors said pathogens upon contact with said pathogens; and b) controllably releasing the one or more molecules from the emulsion into said media, wherein the one or more molecules contact the pathogens thereby reducing the number of pathogens, inhibiting the growth or colonization of the pathogens, or modulating the behaviors of the pathogens. Additional amounts of the one or more molecules may be added by depositing an additional macroemulsion or nanoemulsion containing additional amounts of the one or more molecules on the porous matrix when levels of the molecules drop below a desired level.

Preferably, the emulsion is a macroemulsion or nanoemulsion, the liquid continuous phase is hydrophobic, the plurality of liquid droplets comprise water or a hydrophilic liquid, and the one or more molecules are hydrophilic. Optionally, the one or more molecules are selected from the group consisting of proteins, peptides, saccharides, nucleic acids, plasmid DNA, biologics, small molecules, and combinations thereof. Preferably, the non-adherent pathogens are bacteria, fungi, or a combination thereof, and the one or more molecules are antimicrobial agents, antifungal agents, antibacterial agents, agents that modulate bacterial or fungal quorum sensing, agents that attenuate virulence, or combinations thereof. Optionally, the one or more molecules can modulate the odor, texture, or color of the surrounding environment and chemically or physically associate with other molecules or species in the surrounding environment.

The methods described herein can be used to fabricate physically and chemically durable materials and coatings on objects of arbitrary shape, size, and topology (e.g., on curved surfaces, insides of hollow tubes, etc.). Specifically these slippery surfaces could be used as antifouling surfaces, anti-bacterial/fungal surfaces where the emulsion is used to release of other active agents (e.g., antibiotics, antimicrobial agents, or anti-biofilm agents) that can reduce or inhibit non-adherent pathogens in the surrounding media.

DETAILED DESCRIPTION OF THE INVENTION

Definitions

Figure 1:
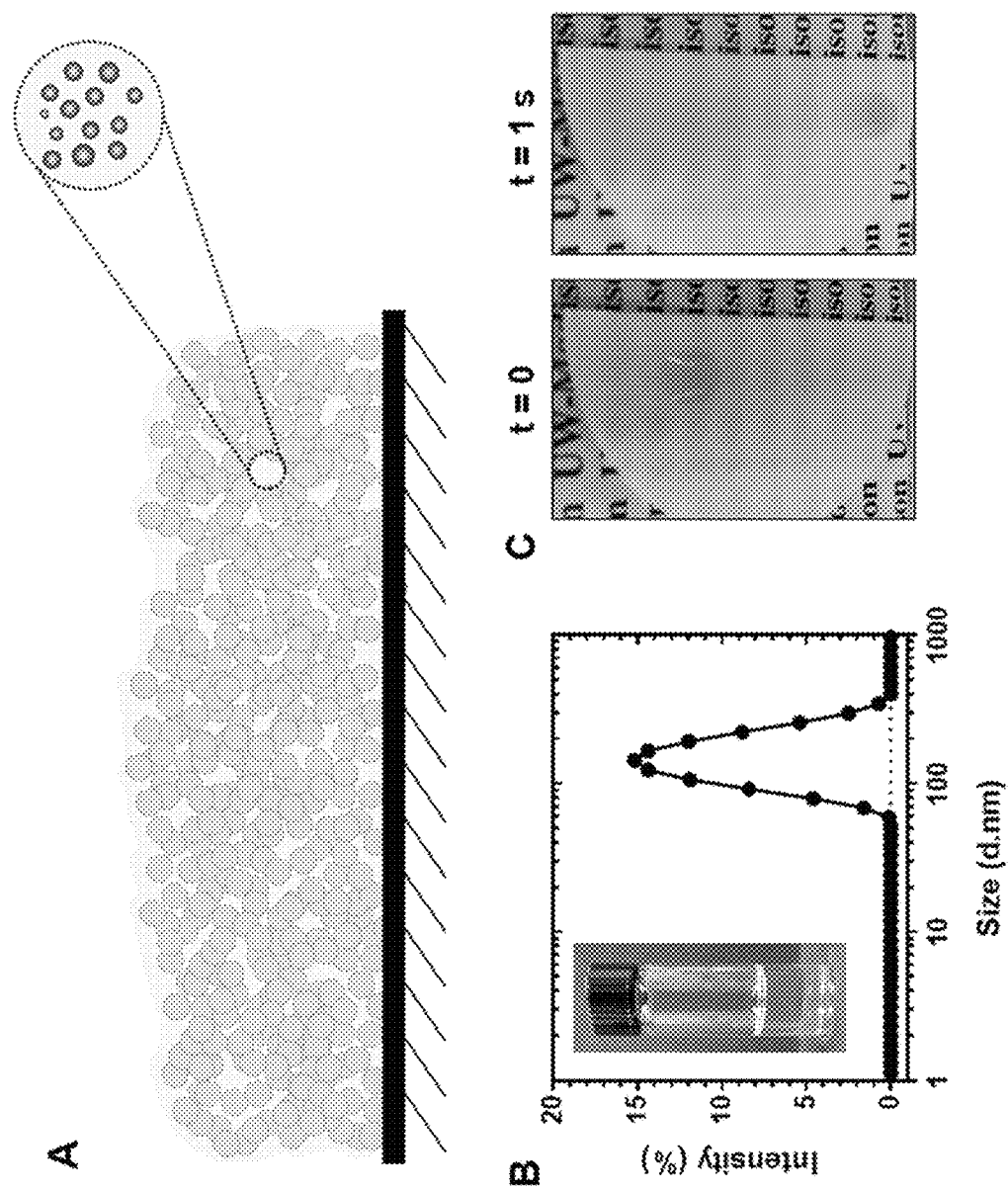
FIG. 1: A) Schematic illustration showing cross-sections of a slippery nanoemulsion-infused porous surface (SNIPS). A chemically-compatible porous substrate is infused with a nanoemulsion resulting in formation of a smooth lubricating layer on top of the surface. In an embodiment, the nanoemulsion comprises a plurality of water droplets dispersed throughout a hydrophobic continuous phase, and molecules of an active agent are embedded in the water droplets. The active agent is released into the surrounding area where it can interact and inhibit adhesion by a microorganism. B) Plot showing the intensity weighed particle size distribution of a water-in-oil (w/o) nanoemulsion. A unimodal distribution is obtained with Z-average size of 134 nm and PDI of 0.134. The inset shows a digital picture of a 'clear' w/o nanoemulsion. C) Digital pictures, acquired from a top down vantage point, of a 25 μL water droplet sliding on a SNIPS membrane (in this instance, an emulsion-infused PTFE membrane).

As used herein, an emulsion refers to a mixture of two or more liquids that are normally immiscible. For example, emulsions can include an oil-in-water emulsion, wherein the oil is the dispersed phase, and water is the continuous phase, as well as water-in-oil emulsion where water is the dispersed phase and the oil is the continuous phase. In an emulsion, one liquid (the dispersed phase) is dispersed in the other liquid (the continuous phase) often in the form of droplets.

As used herein, the term "hydrophilic" refers to a molecule or substance attracted to water, or able to form ionic or hydrogen bonds with polar solvents, in particular with water, or with polar groups. The term "hydrophobic" refers to a molecule or substance that repels water or that is insoluble in water.

As used herein, the term "slippery" refers to surfaces that allow liquid droplets and other compounds to slide off the surface with sliding angles of 90° or less, 70° or less, 50° or less, 40° or less, 30° or less, 20° or less, 10° or less, preferably 5° or less, 2.5° or less, or 2° or less.

As used herein, the term "controllably released" refers to a molecule, drug and/or compound that is initially contained within the porous matrix and/or emulsion and is progressively released into the surrounding media over a consistent period of time. In some embodiments, the time required to release at least 50% of the molecule, drug and/or compound into the surrounding media is 6 hours or more, preferably 24 hours or more, 4 days or more, preferably 10 days or more, 20 days or more, 30 days or more, 60 days or more, 100 days or more, 120 days or more, or 180 days or more.

As used herein, "functionalized polymer" refers to a polymer in which at least a portion of the individual monomer units are substituted with a specific functional group. For the functionalized polymers of the present invention, at least 1% or more, at least 2% or more, at least 5% or more, at least 10% or more, at least 15% or more, at least 20% or more, at least 30% or more, at least 50% or more, at least 75% or more, or at least 90% or more of the portion of the monomer units is substituted with a specific functional group.

An "amine reactive group" or "hydroxyl reactive group" can be any functional group able to react with an amine group or hydroxyl group, respectively.

As used herein, the term "anti-fouling" refers to a material's ability to resist adhesion by an undesirable material, such as oils, organic compounds, and organisms. In particular, it is desirable to prevent or reduce the adhesion of hydrophobic compounds and organisms to a material that is submerged or in contact with water.

The term "nanoscale" refers to a length less than 1,000 nm, preferably less than 100 nm, and the term "microscale" refers to a length less than 1,000 μm, preferably less than 100 μm.

The term "alkyl" refers to a monoradical of a branched or unbranched (straight-chain or linear) saturated hydrocarbon and to cycloalkyl groups having one or more rings. Alkyl groups as used herein include those having from 1 to 20 carbon atoms, preferably having from 1 to 12 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-20 carbon atoms. Cycoalkyl groups include those having one or more rings. Cyclic alkyl groups include those having a 3-, 4-, 5-, 6-, 7-, 8-, 9-, 10-, 11- or 12-member carbon ring and particularly those having a 3-, 4-, 5-, 6-, or 7-member ring. The carbon rings in cyclic alkyl groups can also carry alkyl groups. Cyclic alkyl groups can include bicyclic and tricyclic alkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. An alkoxy group is an alkyl group linked to oxygen and can be represented by the formula R—O. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups.

The term "alkenyl" refers to a monoradical of a branched or unbranched unsaturated hydrocarbon group having one or more double bonds and to cycloalkenyl groups having one or more rings wherein at least one ring contains a double bond. Alkenyl groups include those having 1, 2 or more double bonds and those in which two or more of the double bonds are conjugated double bonds. Alkenyl groups include those having from 2 to 20 carbon atoms, preferably having from 2 to 12 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those having one or more rings. Cyclic alkenyl groups include those in which a double bond is in the ring or in an alkenyl group attached to a ring. Cyclic alkenyl groups include those having a 3-, 4-, 5-, 6-, 7-, 8-, 9-, 10-, 11- or 12-member carbon ring and particularly those having a 3-, 4-, 5-, 6- or 7-member ring. The carbon rings in cyclic alkenyl groups can also carry alkyl groups. Cyclic alkenyl groups can include bicyclic and tricyclic alkyl groups. Alkenyl groups are optionally substituted. Substituted alkenyl groups include among others those which are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogens replaced with one or more fluorine atoms.

The term "aryl" refers to a chemical group having one or more 5-, 6- or 7-member aromatic or heterocyclic aromatic rings. An aromatic hydrocarbon is a hydrocarbon with a conjugated cyclic molecular structure. Aryl groups include those having from 4 to 30 carbon atoms, preferably having from 6 to 18 carbon atoms. Aryl groups can contain a single ring (e.g., phenyl), one or more rings (e.g., biphenyl) or multiple condensed (fused) rings, wherein at least one ring is aromatic (e.g., naphthyl, dihydrophenanthrenyl, fluorenyl, or anthryl). Heterocyclic aromatic rings can include one or more N, O, or S atoms in the ring. Heterocyclic aromatic rings can include those with one, two or three N, those with one or two O, and those with one or two S, or combinations of one or two or three N, O or S. Aryl groups are optionally substituted. Substituted aryl groups include among others those which are substituted with alkyl or alkenyl groups, which groups in turn can be optionally substituted. Specific aryl groups include phenyl groups, biphenyl groups, pyridinyl groups, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocylic aromatic group-containing groups corresponding to any one of the following benzene, naphthalene, naphthoquinone, diphenylmethane, fluorene, fluoranthene, anthracene, anthraquinone, phenanthrene, tetracene, naphthacenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic radical, including monovalent, divalent and polyvalent radicals, of the aromatic and heterocyclic aromatic groups listed above provided in a covalently bonded configuration in the compounds of the present invention. Aryl groups optionally have one or more aromatic rings or heterocyclic aromatic rings having one or more electron donating groups, electron withdrawing groups and/or targeting ligands provided as substituents.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl having one or more hydrogens replaced with one or more fluorine atoms, chlorine atoms, bromine atoms and/or iodine atoms.

Optional substitution of any alkyl, alkenyl and aryl groups includes substitution with one or more of the following substituents: halogens, —CN, —COOR, —OR, —COR, —OCOOR, —CON(R)$_2$, —OCON(R)$_2$, —N(R)$_2$, —NO$_2$, —SR, —SO$_2$R, —SO$_2$N(R)$_2$ or —SOR groups. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for alkyl and alkenyl groups include among others:

—COOR where R is a hydrogen or an alkyl group or an aryl group and more specifically where R is methyl, ethyl, propyl, butyl, or phenyl groups all of which are optionally substituted;

—COR where R is a hydrogen, or an alkyl group or an aryl groups and more specifically where R is methyl, ethyl, propyl, butyl, or phenyl groups all of which groups are optionally substituted;

—CON(R)$_2$ where each R, independently of each other R, is a hydrogen or an alkyl group or an aryl group and more specifically where R is methyl, ethyl, propyl, butyl, or phenyl groups all of which groups are optionally substituted; R and R can form a ring which may contain one or more double bonds;

—OCON(R)$_2$ where each R, independently of each other R, is a hydrogen or an alkyl group or an aryl group and more specifically where R is methyl, ethyl, propyl, butyl, or phenyl groups all of which groups are optionally substituted; R and R can form a ring which may contain one or more double bonds;

—N(R)$_2$ where each R, independently of each other R, is an alkyl group, acyl group or an aryl group and more specifically where R is methyl, ethyl, propyl, butyl, or phenyl or acetyl groups all of which are optionally substituted; or R and R can form a ring which may contain one or more double bonds.

—SR, —SO$_2$R, or —SOR where R is an alkyl group or an aryl groups and more specifically where R is methyl, ethyl, propyl, butyl, phenyl groups all of which are optionally substituted; for —SR, R can be hydrogen;

—OCOOR where R is an alkyl group or an aryl groups;

—SO$_2$N(R)$_2$ where R is a hydrogen, an alkyl group, or an aryl group and R and R can form a ring;

—OR where R is H, alkyl, aryl, or acyl; for example, R can be an acyl yielding —OCOR* where R* is a hydrogen or an alkyl group or an aryl group and more specifically where R* is methyl, ethyl, propyl, butyl, or phenyl groups all of which groups are optionally substituted.

As used herein, the term "alkylene" refers to a divalent radical derived from an alkyl group or as defined herein. Alkylene groups in some embodiments function as attaching and/or spacer groups in the present compositions. Compounds of the present invention include substituted and unsubstituted $C_1$-$C_{30}$ alkylene, $C_1$-$C_{12}$ alkylene and $C_1$-$C_5$ alkylene groups. The term "alkylene" includes cycloalkylene and non-cyclic alkylene groups.

As used herein, the term "cycloalkylene" refers to a divalent radical derived from a cycloalkyl group as defined herein. Cycloalkylene groups in some embodiments function as attaching and/or spacer groups in the present compositions. Compounds of the present invention include substituted and unsubstituted $C_1$-$C_{30}$ cycloalkenylene, $C_1$-$C_{12}$ cycloalkenylene and $C_1$-$C_5$ cycloalkenylene groups.

As used herein, the term "alkenylene" refers to a divalent radical derived from an alkenyl group as defined herein. Alkenylene groups in some embodiments function as attaching and/or spacer groups in the present compositions. Compounds of the present invention include substituted and unsubstituted $C_1$-$C_{20}$ alkenylene, $C_1$-$C_{12}$ alkenylene and $C_1$-$C_5$ alkenylene groups. The term "alkenylene" includes cycloalkenylene and non-cyclic alkenylene groups.

As used herein, the term "cycloalkenylene" refers to a divalent radical derived from a cylcoalkenyl group as defined herein. Cycloalkenylene groups in some embodiments function as attaching and/or spacer groups in the present compositions.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups, and methoxyphenyl groups, particularly 4-methoxyphenyl groups.

As used herein, the term "halo" refers to a halogen group such as a fluoro (—F), chloro (—Cl), bromo (—Br) or iodo (—I).

As to any of the above groups which contain one or more substituents, it is understood, that such groups do not contain any substitution or substitution patterns which are sterically impractical and/or synthetically non-feasible. In addition, the compounds of this invention include all stereochemical isomers arising from the substitution of these compounds.

Overview

Surface-associated fouling by bacteria is a common and persistent challenge facing the use of biomedical devices, industrial equipment, and many consumer products. The development of strategies that can slow or prevent microbial attachment and attenuate other bacterial behaviors on surfaces is an important element in the design of materials and coatings intended for use in wet environments.

The materials of the present invention comprise a porous or textured surface infused with a macroemulsion or nanoemulsion. The infused emulsion is maintained as a dynamic film at the surface, creating a typically hydrophobic or omniphobic interface that allows other fluids and substances to more easily slide or 'slip' off the surface. Several recent reports suggest SLIPS materials that utilize hydrophobic oils (no emulsion) on the surface to be a promising platform for the development of new anti-biofouling interfaces for biological and environmental applications. Indeed, SLIPS have been reported to resist fouling by a broad range of organisms, including clinically important bacterial and fungal pathogens, marine barnacle cyprids, and mammalian cells.

However, conventional SLIPS-coated surfaces cannot prevent bacteria from colonizing other nearby (non-SLIPS-coated) surfaces. Conventional SLIPS also do not kill bacteria; organisms that are prevented from adhering to SLIPS-coated surfaces remain alive in the surrounding medium, and SLIPS do not currently have inherent mechanisms through which they can prevent these non-adherent (or 'planktonic') bacteria from producing toxins or engaging in other virulent behaviors, including forming biofilms on nearby unprotected surfaces.

To address these issues and develop new slippery anti-fouling surfaces that also exert control over the behaviors of microorganisms in surrounding media, previous applications (see U.S. Pat. No. 10,557,042) described a controlled release-based approach to the design of multifunctional SLIPS that prevent biofouling by pathogenic fungal and bacterial cells and kill planktonic microorganisms in surrounding media.

In this approach, the long-term release of small-molecule compounds, particularly agents directed toward microorganisms (such as bacteria and fungi), are released from the SLIPS to the surrounding media. Experimental studies demonstrated that such small-molecule anti-microbial agents can be readily incorporated into SLIPS without impacting the anti-fouling properties of the SLIPS surfaces, and that the slow release of such anti-microbial agents can kill planktonic fungal cells effectively and improve the overall anti-fouling and antifungal properties.

Such anti-microbial agents include, but are not limited to triclosan and other broad-spectrum antibiotics. It should be noted, however, that the use of triclosan and other cytotoxic drugs (e.g., antibiotics) have several disadvantages in applied contexts, including the fact that the widespread use of these agents has led to evolved resistance in many clinically relevant pathogens.

Additionally, because those past approaches involve the design of SLIPS using just hydrophobic liquids, the utility of those approaches has been limited to the loading and release of hydrophobic agents that have at least some appreciable solubility in hydrophobic liquids. It is generally very difficult to use such methods to load and release hydrophilic agents, including small molecule drugs, proteins, peptides, and nucleic acids, that are not appreciably soluble in liquid oil phases.

Accordingly, by infusing the porous matrix with macroemulsions and nanoemulsions, the present invention enables a wider range of active agents, especially hydrophilic agents, to be loaded and controllably released from slippery antifouling surfaces and similar materials. Materials fabricated by infusing a macroemulsion or nanoemulsion into a microporous or nanoporous matrix are referred herein to as slippery nanoemulsion-infused porous surfaces (SNIPS).

Example 1

Fabrication of Microporous Materials Having Emulsions Able to Controllably Release Hydrophilic Active Agents General Considerations: Dynamic light scattering measurements were performed using a Malvern Zetasizer ZS Nano. Aliquots (1 mL) of nanoemulsions were transferred to a 1 cm×1 cm plastic cuvette, the cuvette was then placed in the Zetasizer for 2 min at 24° C., and the scattered light intensity was measured by the detector placed at an angle of 173° from the 632.8 nm incident laser. The correlator measured the intensity correlation function for delay times ranging from 2 µs to 200 ms.

Sliding time was measured by placing a desired volume of water droplet on SNIPS held at an angle of 30°. The time required by the droplet to slide through the length of SNIPS (3 cm) was measured using a digital timer. Measurements of the fluorescence of solutions used to characterize the release of fluorescein isothiocyanate-dextran (FITC-dextran) from SNIPS were made using a NanoDrop3300 (Thermo Scientific). Fluorescence microscopy was performed using an Olympus IX71 inverted microscope and images were obtained using the MetaMorph Advanced version 7.7.8.0 software package (Universal Imaging Corporation). Images were processed using NIH Image J software and Microsoft Powerpoint for Office 365.

Laser-scanning confocal microscopy (LSCM) images were acquired using a Nikon A1-R high-speed confocal microscope and processed using Nikon Instruments Software. Scanning electron micrographs were acquired using a LEO 1550 SEM at an accelerating voltage of 3 kV using in-lens SEM detector. The porous PTFE membranes were mounted on a SEM stub by conductive carbon tape, and the sides of the membranes were grounded to the stub using conductive carbon cement. Samples were coated with a thin layer of gold using a gold sputterer operating at 45 mA under a vacuum pressure of 50 mTorr for 2 min before imaging.

Figure 12:
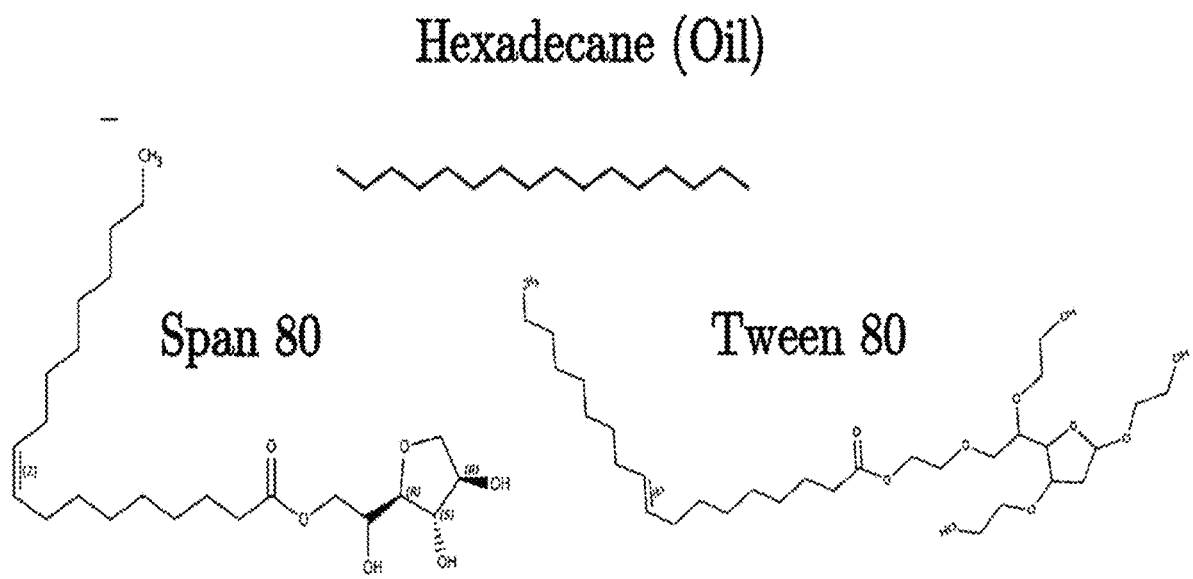
FIG. 12: Structures of an oil (hexadecane) making up a hydrophobic continuous phase and of the surfactants used to form the nanoemulsion in an embodiment of the invention.
Figure 13:
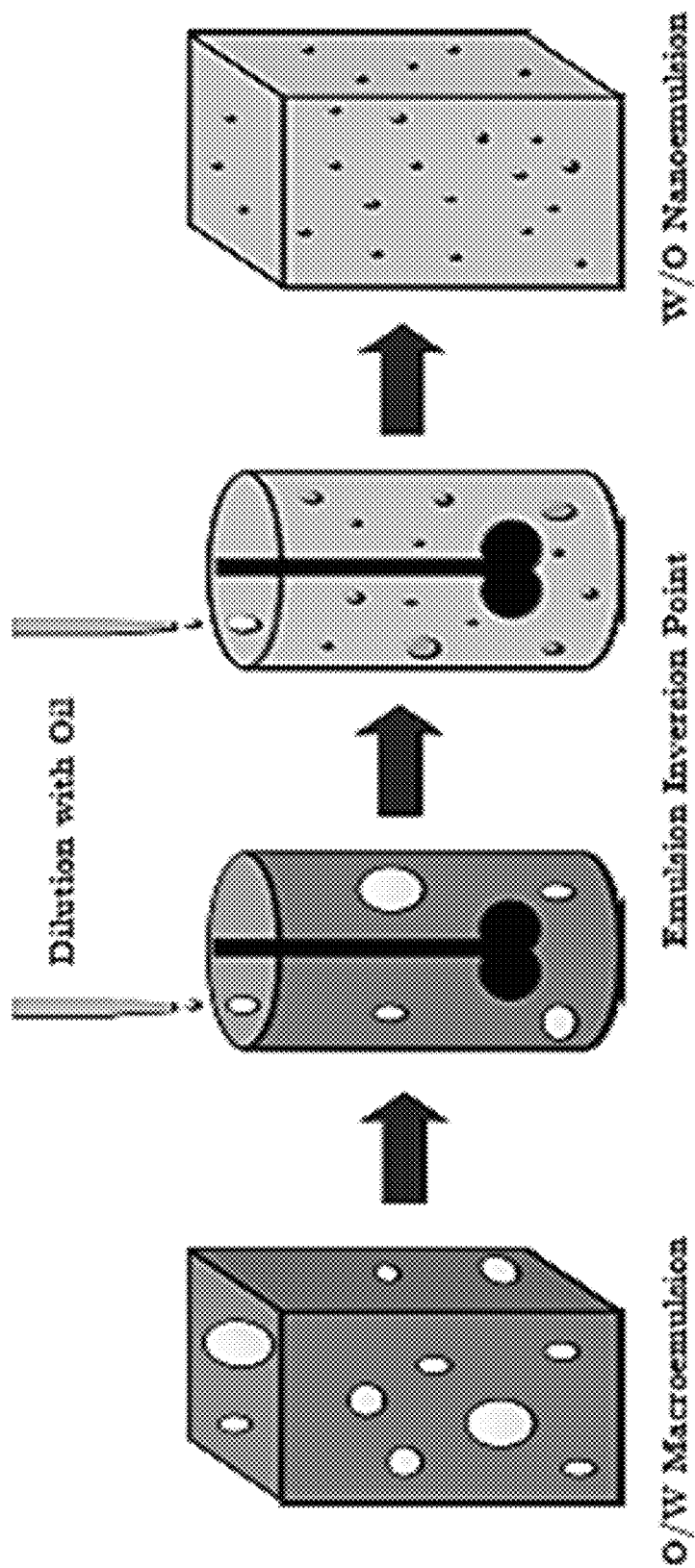
FIG. 13: Illustrates forming a water-in-oil nanoemulsion using phase inversion. The continuous phase (oil) is slowly added to an initial oil-in-water (o/w) macroemulsion. The system passes through a region of very low interfacial tension where small nanometer size (water) droplets are formed resulting into a w/o nanoemulsion.
Figure 14:
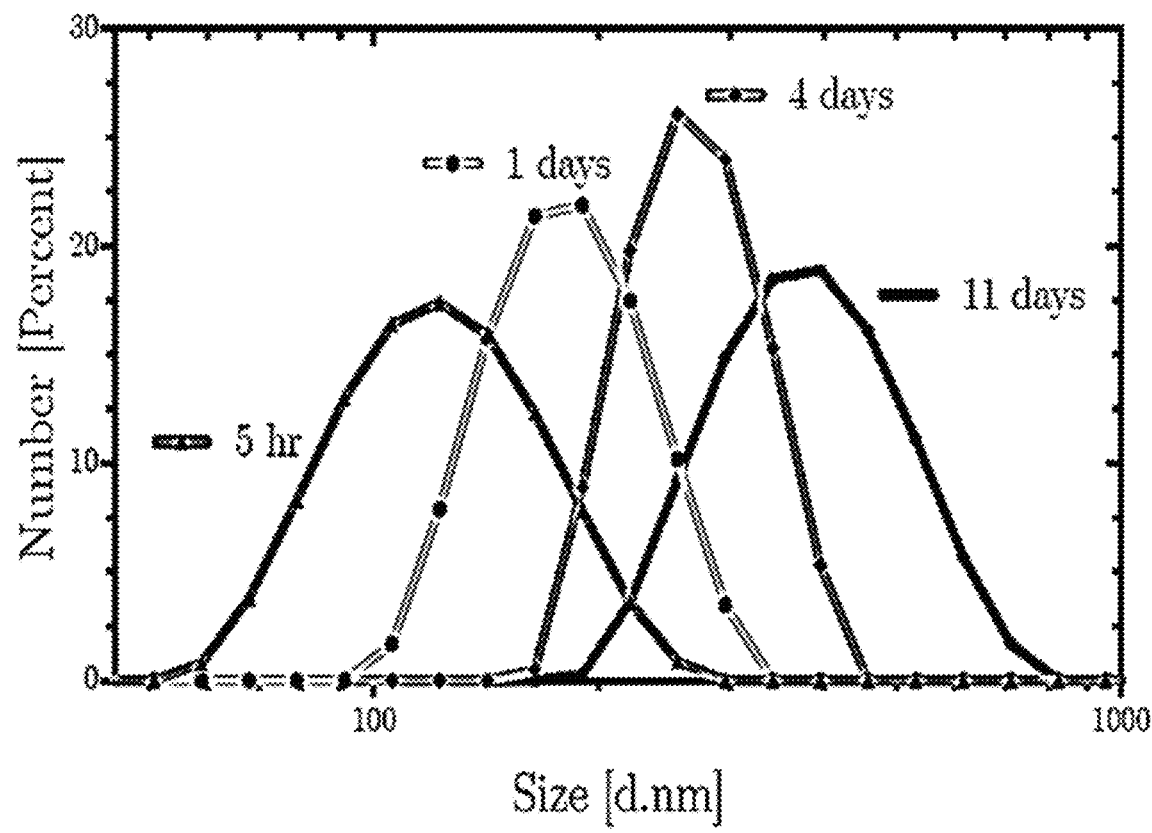
FIG. 14: Plot showing diameter of water droplets over time, from 5 hours to 11 days. This model nanoemulsion system showed adequate monodispersity (PDI<0.2) and was stable for more than a week at 37° C. Water droplet size increases gradually over time as measured by Dynamic Light Scattering (DLS).
Figure 15:
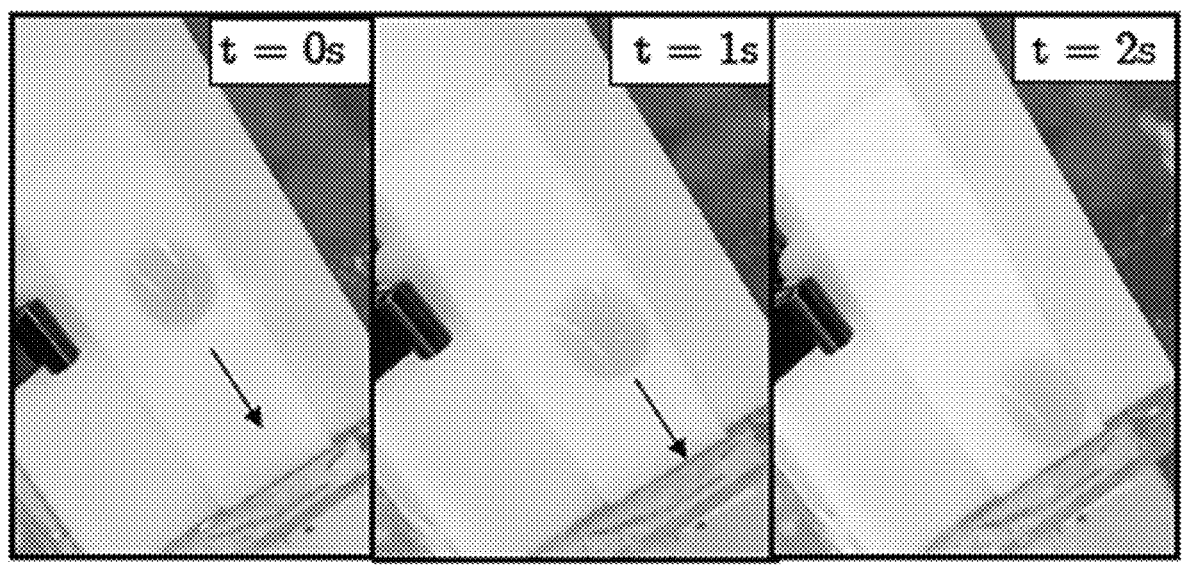
FIG. 15: Digital pictures of a 25 μL water droplet sliding on a Teflon-membrane infused with nanoemulsion (substrate at <30° angle).

Preparation of water-in-oil nanoemulsions: 7.5 parts by weight of polyoxyethylene (20) sorbitan monooleate (Tween® 80) and 22.5 parts by weight of sorbitan monooleate (Span® 80) were dissolved in 70 parts by weight of n-hexadecane (structures shown in FIG. 12). The surfactant solution in n-hexadecane was then vortexed for 1 minute and filtered through a 0.2 µm PTFE filter. 100 µL (5% v/v) of MiliQ water was added to a glass vial (16×50 mm), and the surfactant mixture in n-hexadecane was gently added to the vial (@ a rate of 200 µL per 20 s) under constant stirring by magnetic stir plate (generally illustrated in FIG. 13). The formed nanoemulsion was then left stirring at room temperature for 10 min and finally filtered through 1 µm PTFE filter.

Figure 11:
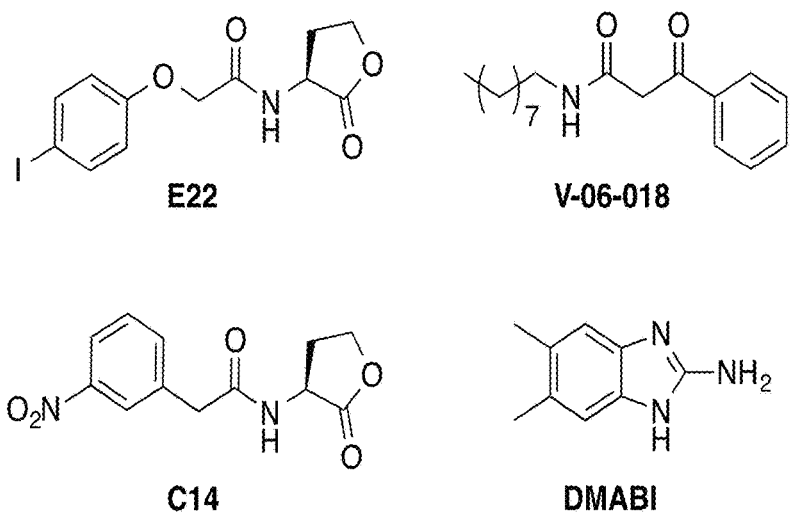
FIG. 11: Structures of small molecule anti-virulence agents used in an embodiment of the invention.

FITC-dextran loaded nanoemulsions were also prepared using the above-mentioned protocol. The concentration of FITC-dextran in water was kept at 5 mg/ml. Structures of small molecule anti-virulence agents used in one embodiment of the invention prepared in a similar manner are shown in FIG. 11.

Figure 6:
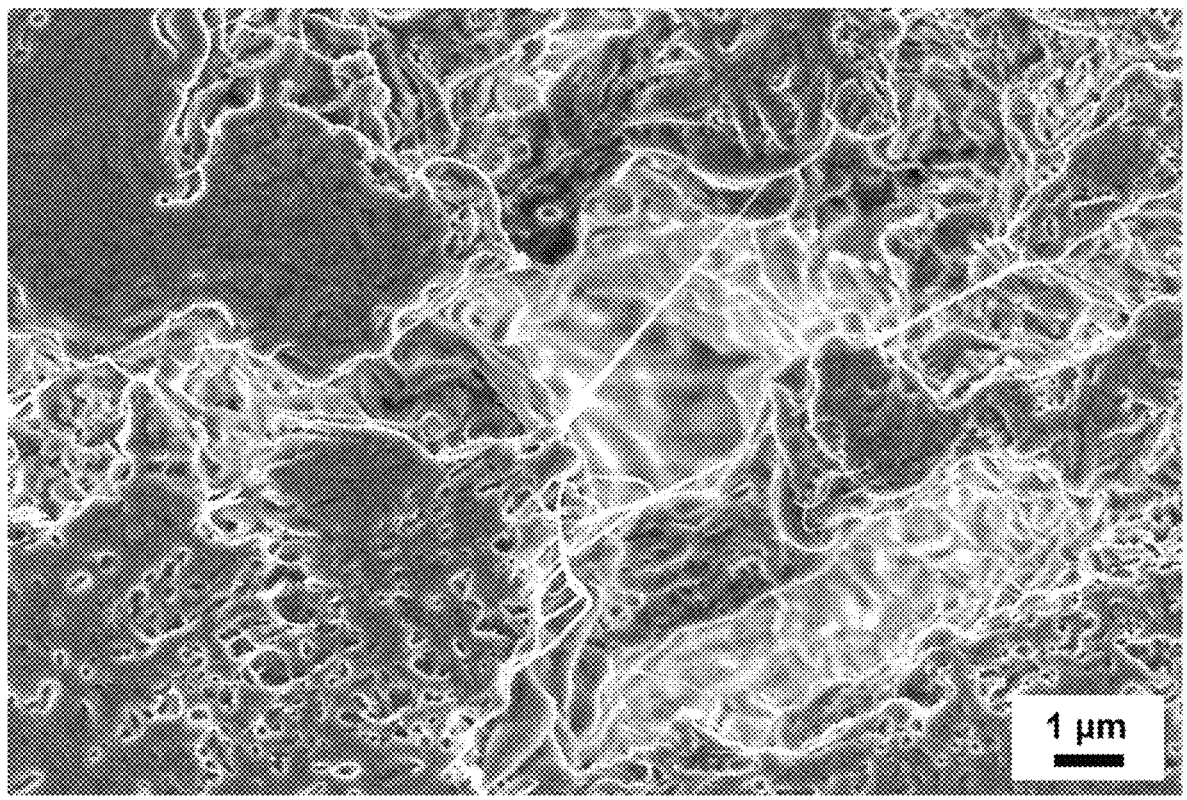
FIG. 6: Top-down SEM image of a porous PTFE membrane (pore size of 5 μm, thickness of 152-254 μm).

Infusion of nanoemulsion: Lubricating liquid (w/o nanoemulsion or n-hexadecane) was added on the top of the porous PTFE membrane (pore size of 5 µm, thickness of 152-254 µm, see FIG. 6) using a pipette (15 µL/cm$^2$). The lubricating liquid was then spread using tweezers to form a uniform over-coated layer. After waiting a few minutes for lubricating liquid to get infused in the porous PTFE membrane (evident by change in opacity of the membrane) through capillary wicking, the excess lubricating was removed from the surface by dabbing with a weighing paper.

Figure 7:
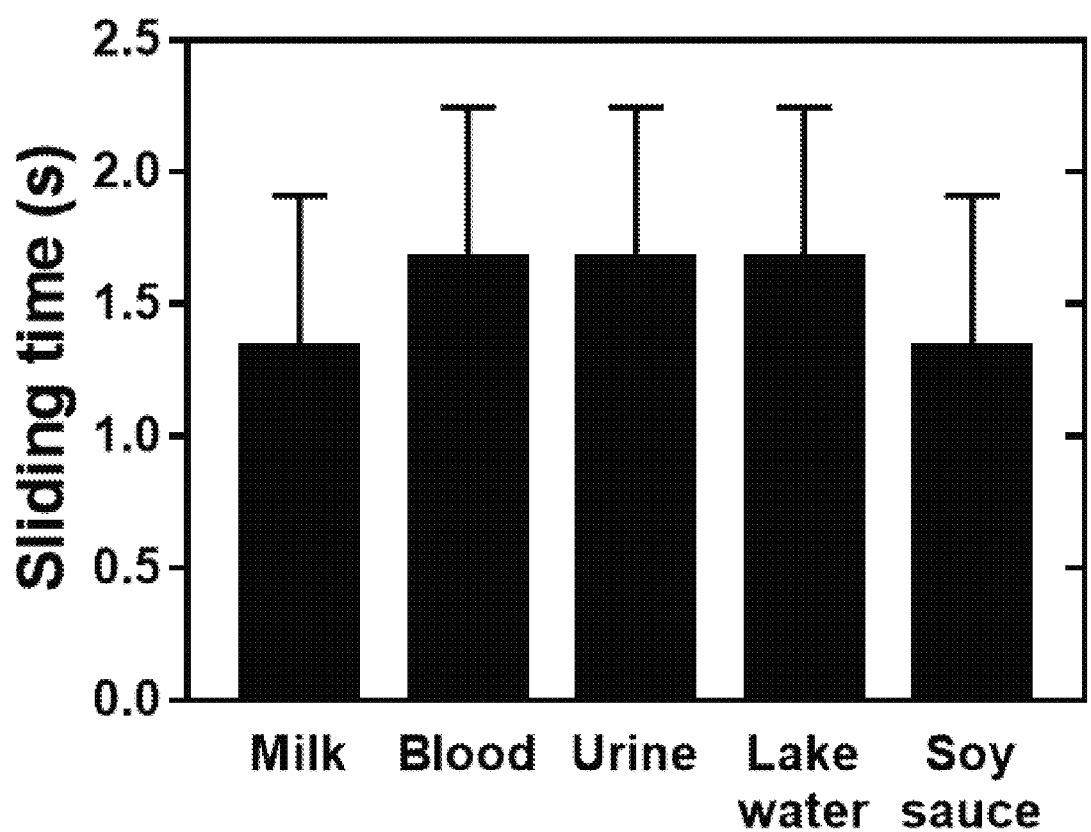
FIG. 7: Plot showing the sliding time of 25 μL droplets of complex liquids on SNIPS tilted to 30°.

A schematic illustration of a nanoemulsion-infused porous surface (SNIPS) is shown in FIG. 1, panel A. FIG. 1, panel B, shows the particle size distribution of a formed water-in-oil (w/o) nanoemulsion. The sliding time of 25 µL droplets of water on the SNIPS are shown in FIG. 1, panel C. The sliding time of 25 µL droplets of "complex" liquids on SNIPS are shown in FIG. 7.

Figure 8:
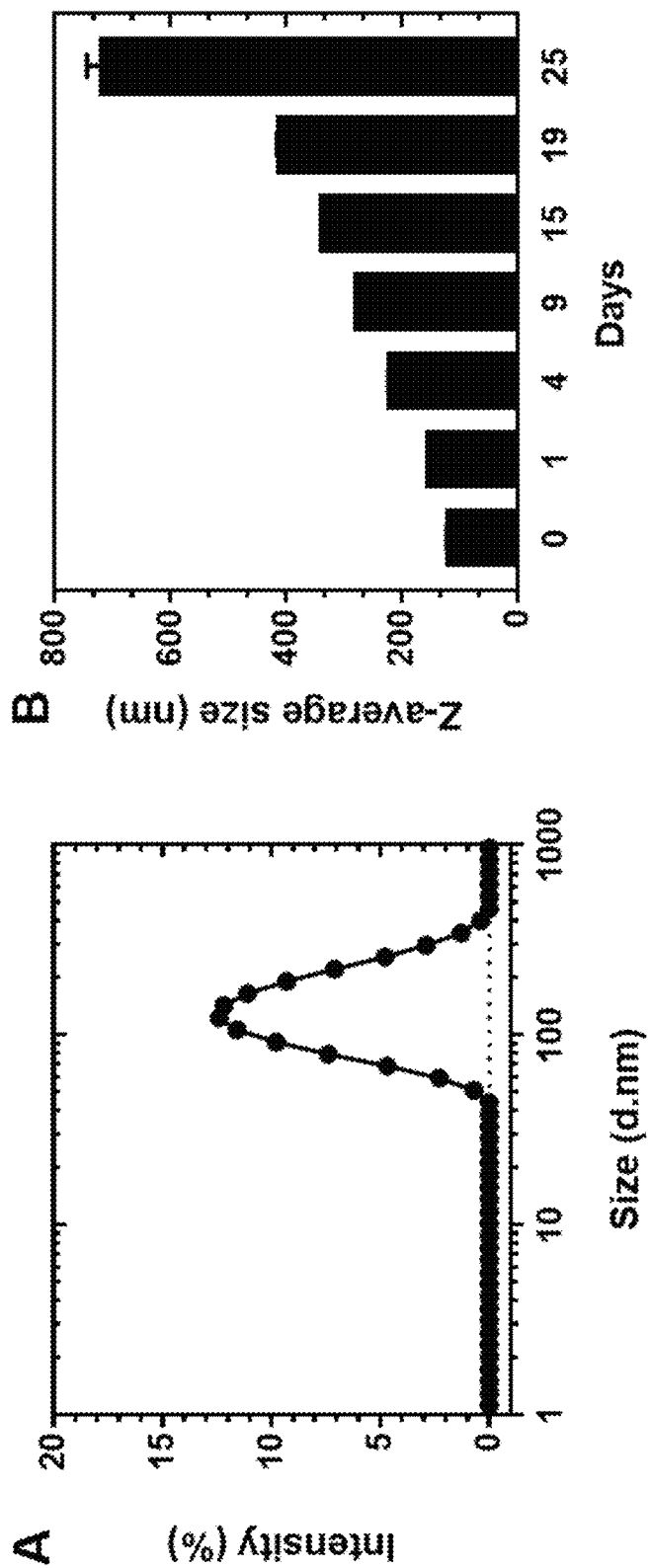
FIG. 8: A) Plot showing the intensity weighed particle size distribution of w/o nanoemulsion loaded with FITC-dextran. A unimodal distribution is obtained with Z-average size of 124 nm and PDI of 0.153. B) Additional plot showing Z-average size vs time for FITC-loaded w/o nanoemulsion incubated at 37° C. Data points represent the mean of three independent DLS measurements. Error bars denote standard deviation.
Figure 9:
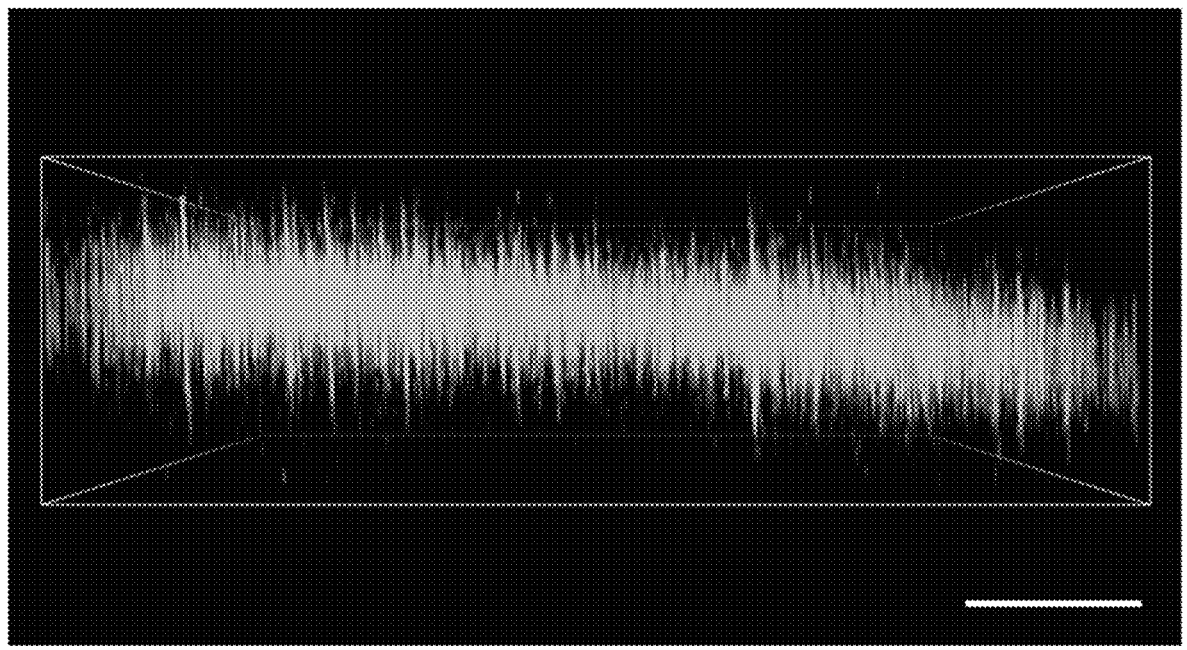
FIG. 9: Fluorescence image showing combined Z-stack of SNIPS loaded with FITC-dextran obtained from confocal microscopy. The bounding box shows the x-z plane. Scale bar is 250 μm.
Figure 10:
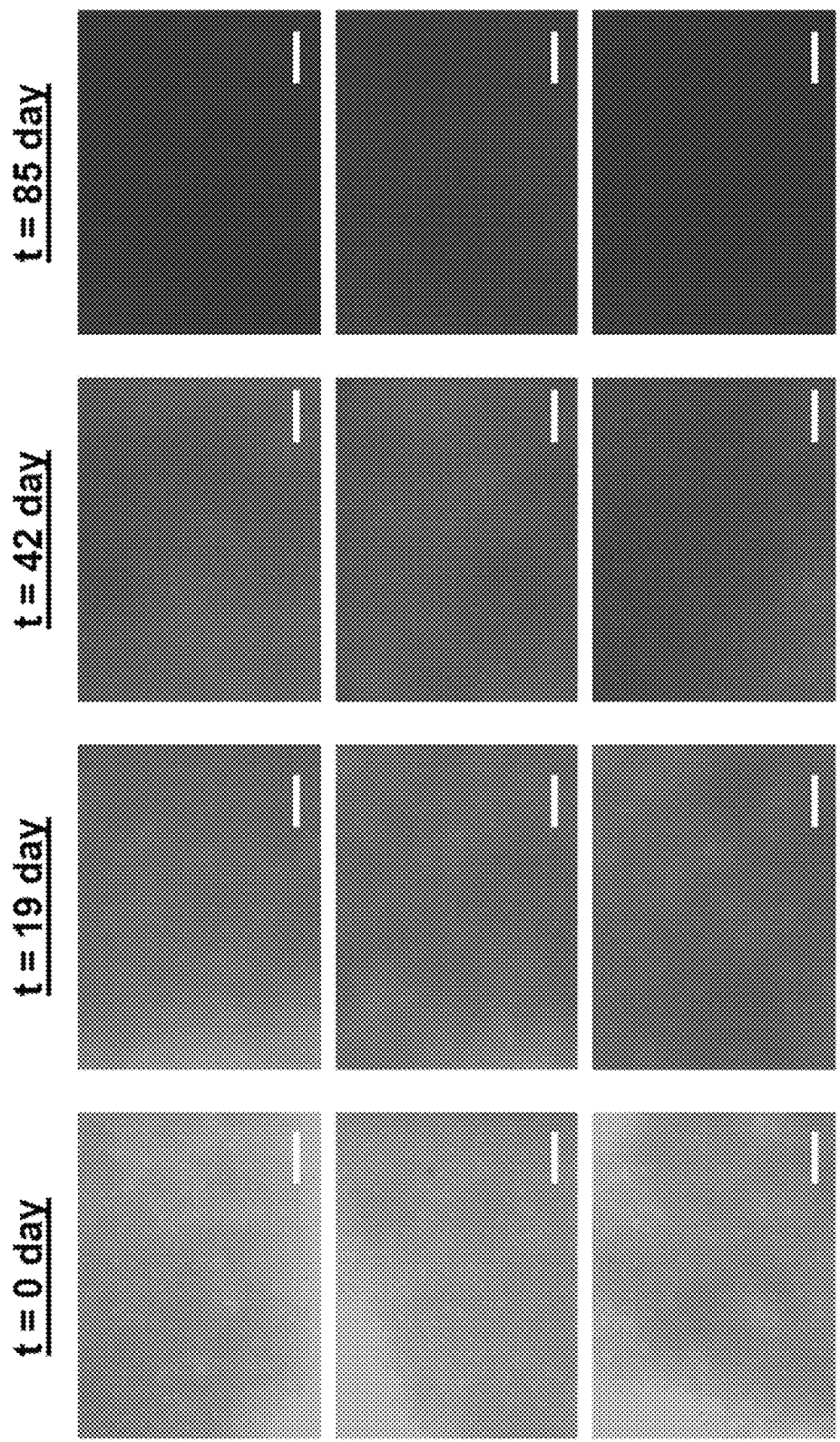
FIG. 10: Fluorescence microscopy images of the surfaces of FITC-dextran loaded SNIPS at different time points (t=0, 19, 42, and 85 days) upon incubation in PBS buffer at 37° C. Scales bars are 400 μm.

Loading and release of FITC-dextran: The FITC-dextran loaded nanoemulsion was infused into the porous PTFE membranes (1×3 cm) to fabricate SNIPS using the protocol described above. Characterization of a nanoemulsion loaded with FITC-dextran and SNIPS loaded with FITC-dextran are shown in FIGS. 8-10.

Figure 2:
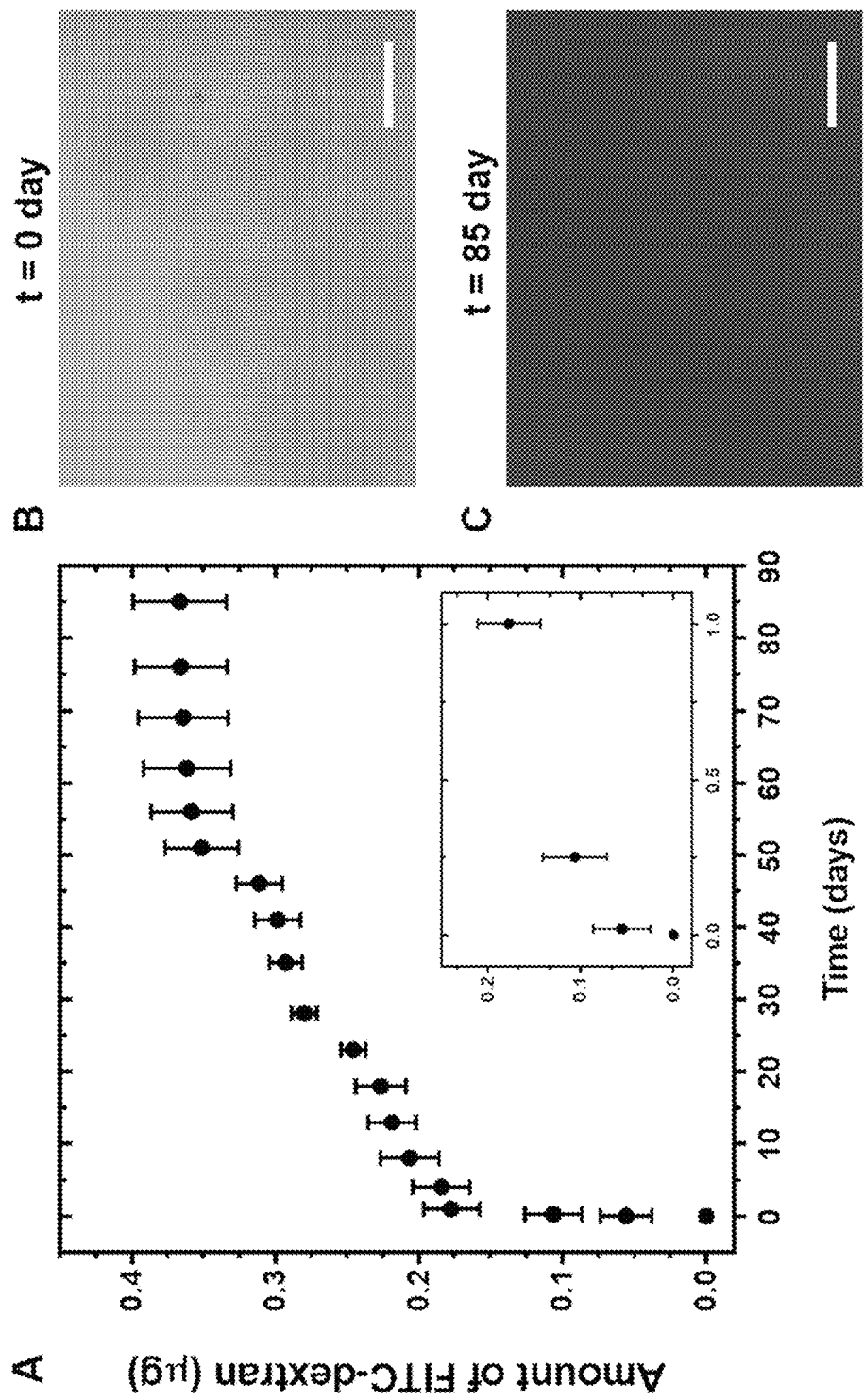
FIG. 2: A) Plot showing the amount of fluorescein isothiocyanate-dextran (FITC-dextran) released over time from FITC-dextran loaded SNIPS, incubated in PBS buffer at 37° C. Data points represent the mean of four replicates and error bars represent standard deviation. The inset shows the release of FITC-dextran from SNIPS over the first day of incubation in PBS buffer. B,C) Fluorescence microscopy images of the surfaces of FITC-dextran loaded SNIPS B) before and C) after (t=85 days) incubation in PBS buffer at 37° C. Scales bars are 400 μm.
Figure 16:
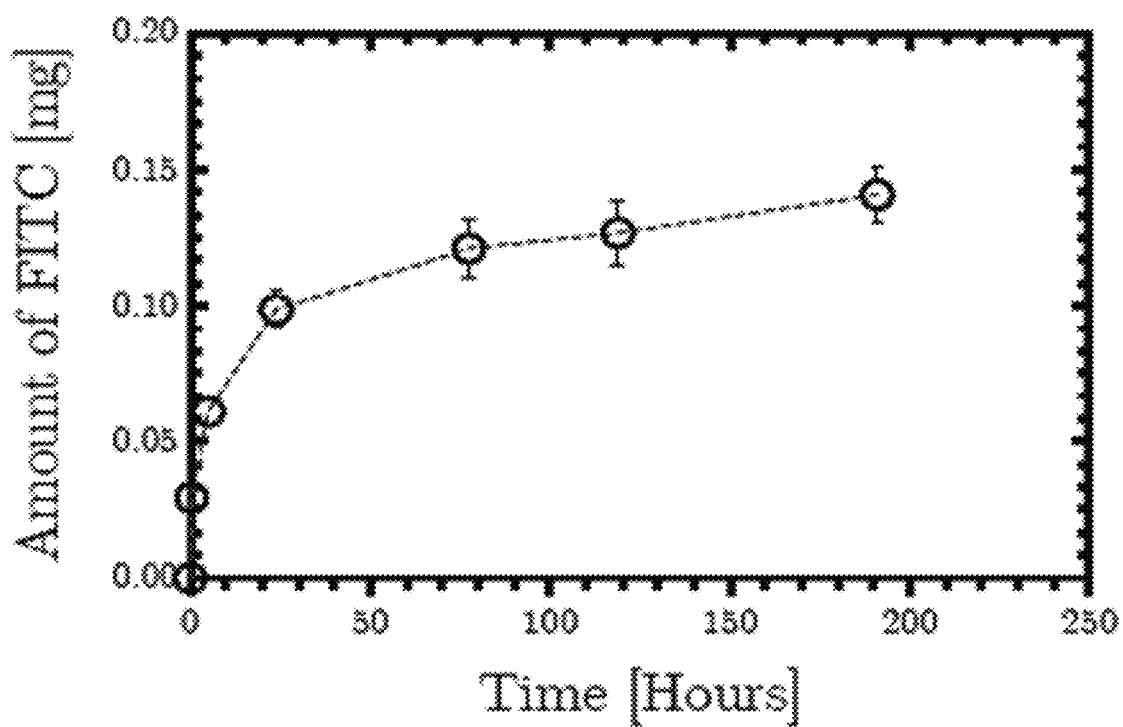
FIG. 16: Plot showing amount of FITC released from nanoemulsion-infused SLIPS over time (0 to 200 hours).

Characterization of the release of FITC-dextran from these SNIPS was performed by incubating SNIPS in 3 mL of PBS buffer at 37° C. (FIG. 2). At predetermined time points, SNIPS were removed from the incubator for sliding time, biofouling, and fluorescence imaging assay. The buffer was removed for analysis and the solution fluorescence was measured at an excitation of 490 nm and an emission of 525 nm, corresponding to the excitation and emission maxima of the FITC-dextran. Fluorescence measurements resulting from these experiments were converted to FITC-dextran mass using a calibration curve generated using known concentrations of FITC-dextran. After each measurement, the SNIPS were immersed in an aliquot of fresh PBS and returned to the incubator. The plot shown in FIG. 2A was made by cumulatively adding the concentration of FITC-dextran released into solution at each of the time points. A release curve showing the amount of FITC released from a nanoemulsion-infused SLIPS over 200 hours is shown in FIG. 16.

Estimation of anti-biofouling performance of SNIPS: Freezer stocks of S. aureus were maintained in 1:1 brain heart infusion media (BHI): glycerol (50% v/v in MiliQ) and stocks of P. aeruginosa and E. coli were maintained in 1:1 Luria-Bertani (LB):glycerol at −80° C. Overnight cultures of bacteria were grown in LB medium (P. aeruginosa and E. coli) or BHI medium (S. aureus) at 37° C. with shaking at 200 rpm. To prepare the inoculating subculture of S. aureus, the overnight cultures were washed 3 times with BHI+1% (w/v) glucose. For washing, a desired volume of S. aureus suspensions was transferred to sterilized 1.5 mL microcentrifuge tubes, centrifuged at 16,100×g for 5 min and followed by resuspension of the cell pellet in an amount of fresh BHI+1% (w/v) glucose equivalent to the original volume of cell suspension. The final S. aureus cell pellet after 3 washes was resuspended in BHI (+1% (w/v) glucose) in an amount equivalent to yield a starting inoculum absorbance (at 600 nm) of 0.23 (~$10^8$ CFU/ml). An inoculating subculture of P. aeruginosa was prepared by centrifugation of the overnight culture at 4,000×g for 10 min followed by resuspension of the cell pellet in an amount of fresh M9+ medium, effecting a 1:10 dilution (v/v) of the overnight culture (M9+ medium consists of the M9 buffer, described above, supplemented with 0.4% arginine, 0.5% casamino acids, 0.2% glucose, 0.2% succinate, 0.2% citrate, 0.2% glutamate, $1 \times 10^{-3}$ M $MgSO_4$, and $0.1 \times 10^{-3}$ M $CaCl_2$). E. coli subcultures were prepared by diluting overnight cultures 1:1000 into fresh LB medium.

Figure 3:
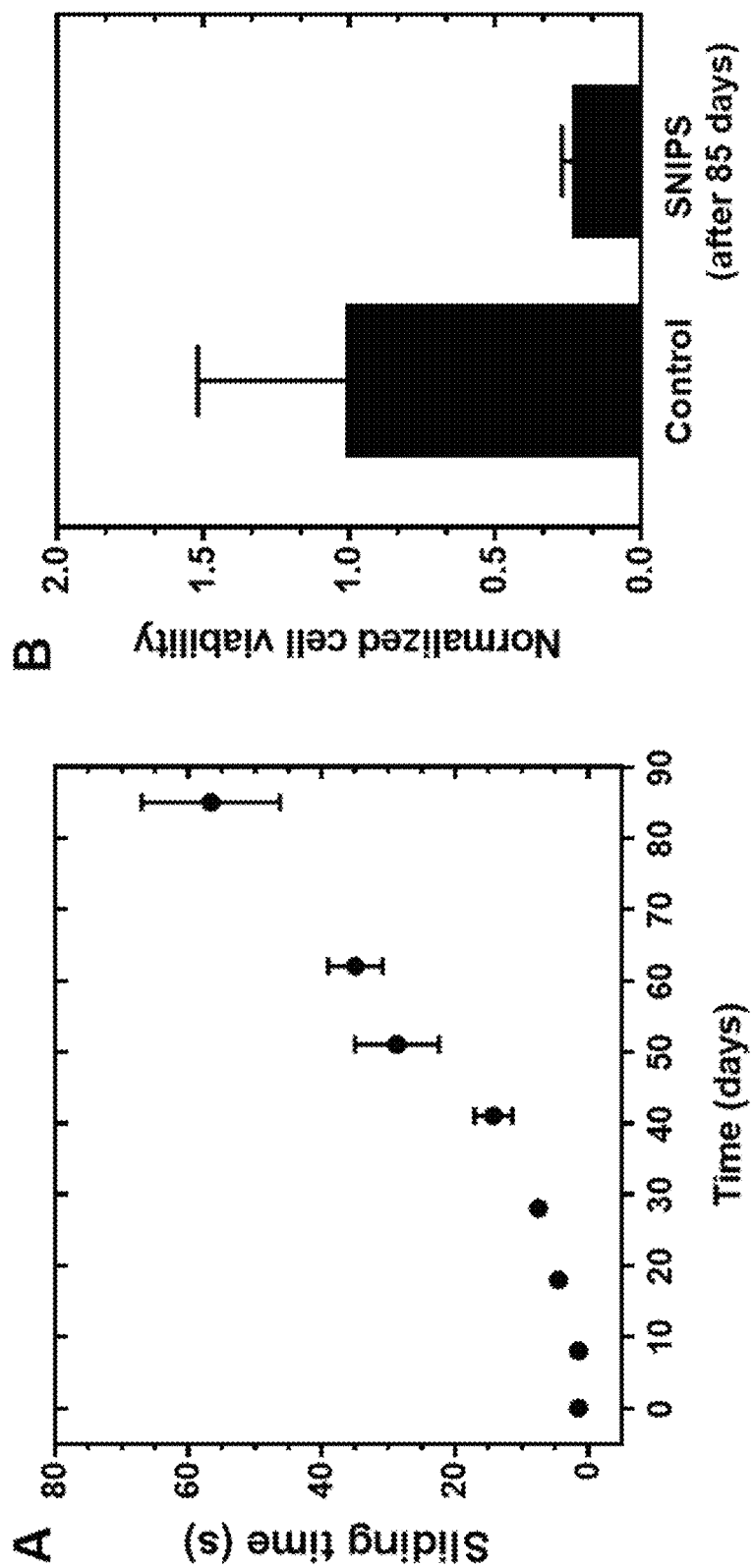
FIG. 3: A) Plot showing the sliding time of water droplets on SNIPS at predetermined time points after incubation of SNIPS in PBS buffer at 37° C. A 25 μL water droplet was used for the sliding time measurements and the SNIPS were tilted to 30°. B) Plot showing the viability of the $S.$ $aureus$ cells associated with the surfaces of control (porous PTFE membrane) and SNIPS (nanoemulsion-loaded PTFE membranes; after 85 days of incubation in PBS at 37° C.). The cell viability values are normalized to the control.
Figure 4:
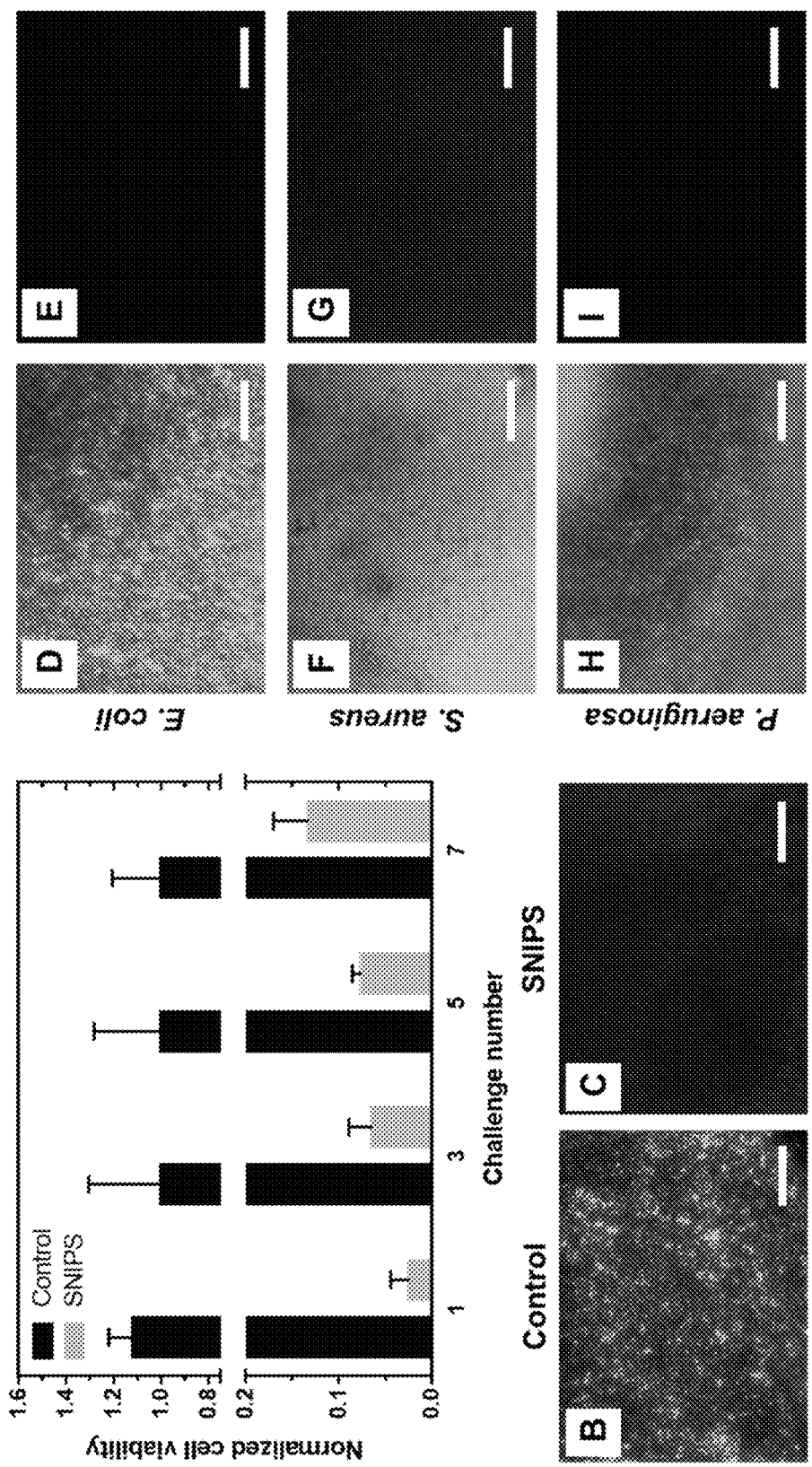
FIG. 4: A) Plot showing the viability of $S.$ $aureus$ cells associated with the surfaces of control (bare PTFE membrane; black) and SNIPS (nanoemulsion-loaded PTFE membranes; grey) after each of seven consecutive 24 h challenges in $S.$ $aureus$ inoculum, as determined using BacTiter-Glo™ assay. B,C) Microscopy images showing the surfaces of B) control (porous PTFE membrane) and C) SNIPS after seven consecutive 24 h challenges with $S.$ $aureus$ suspensions. D-I) Fluorescence microscopy images of the surfaces of control (porous PTFE membrane) and SNIPS after incubation in suspensions of $E.$ $coli$ (D,E), $S.$ $aureus$ (F,G), and $P.$ $aeruginosa$ (H,I) for 24 h. Scale bars are 400 μm. Error bars represent standard deviation.

For multiple challenge experiments (FIGS. 3-4), substrates were incubated with S. aureus inoculum (prepared as described above) in a 6-well plate at 37° C. At the end of each 24 h period, three SNIPS substrates and controls were removed from their wells using forceps, gently dabbed on a paper towel to remove excess liquid, and placed in the wells of a new 6-well plate to characterize for the extent of biofouling on the surface by BacTiter-Glo™ assay (as described below). The remaining SNIPS were then incubated in fresh S. aureus inoculum to perform the next challenge (new bare porous PTFE membranes were used in control experiments). Seven such 24 h challenges were performed, and at the end of the seventh challenge, along with BacTiter-Glo™ assay the biofilms on the substrates were stained with a green fluorescent nucleic acid stain (SYTO-9) according to the manufacturer's protocol. Excess staining solution was removed by dabbing on a paper towel and the substrates were then transferred to the wells of a 24-well plate and covered by 400 μL PBS. Biofilms were then imaged using an Olympus IX71 fluorescence microscope.

Figure 17:
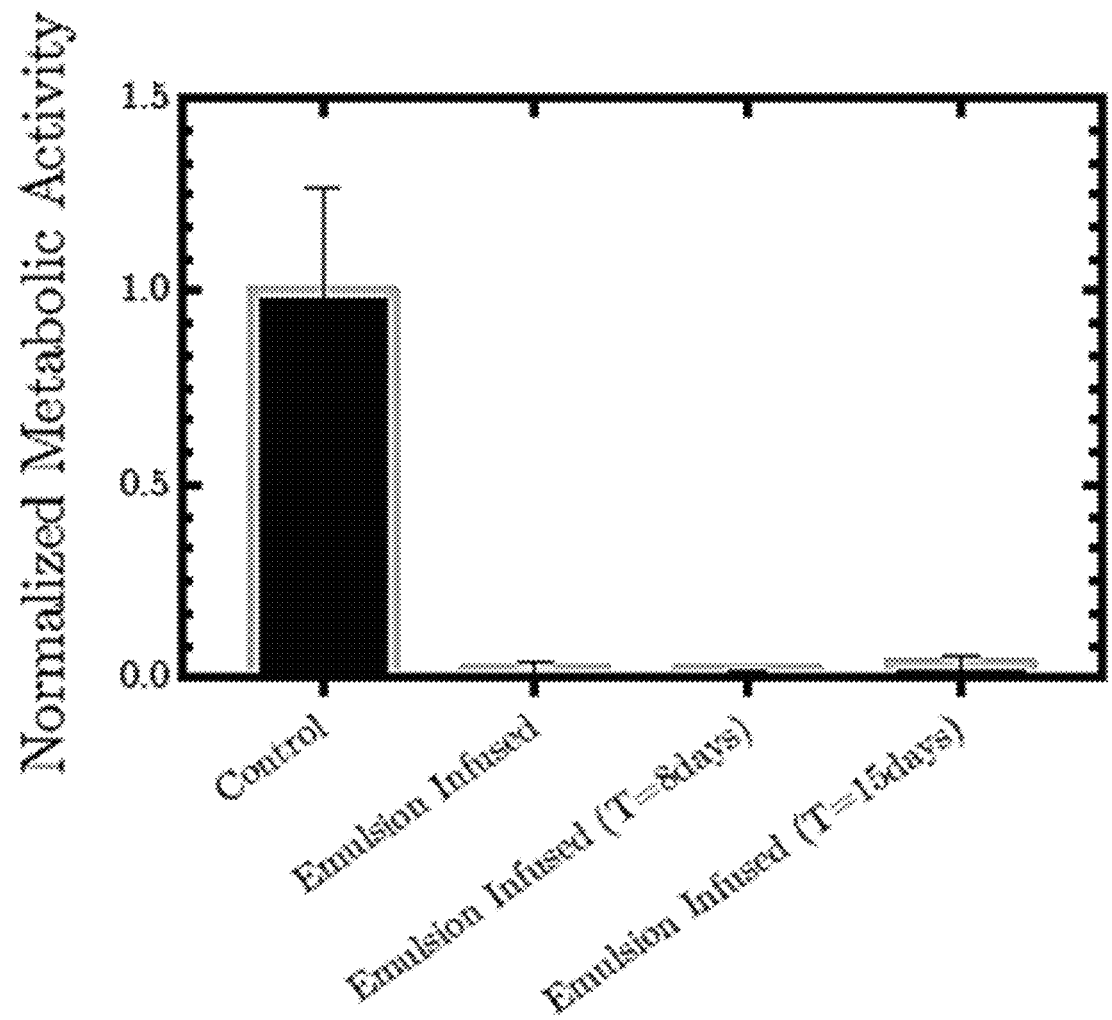
FIG. 17: Plot showing metabolic activity of microorganisms on or surrounding SLIPS for a control (no emulsion) and emulsion infused SLIPS (0 days, 8 days, and 15 days). The nanoemulsion-infused SLIPS retains antifouling characteristics for 15 days.

Metabolic activity of microorganisms on or surrounding a SLIPS control (no emulsion) and emulsion infused SLIPS over 15 days is shown in FIG. 17.

For the BacTiter-Glo™ assay, the BacTiter-Glo™ solution (prepared as described by the manufacturer's protocol) was diluted 2× in Mili-Q water and added to 6-well plate containing SNIPS and control (porous PTFE membrane). The 6-well plate was incubated for 5 mins in the dark at room temperature. 50 μL of BacTiter-Glo™ solution from the plates was added to a clear-bottom white 96-well plate (Corning 3610). Luminesence was read in a Synergy 2 plate reader (Biotek) with Gen5 1.05 software. The luminescence values collected from the plate reader were normalized with respect to the control.

Stability of SNIPS in presence of water droplets. A calculation for the stability of the SNIPS in the presence of a water droplet is provided below in Table 1. Unit of contact angle is in degree. The contact angles are measured on a flat smooth PTFE surface using 5 μL water droplet for $\Theta_{ws(a)}$ and 5 μL w/o nanoemulsion for $\Theta_{os(a)}$. The unit of surface tension and interfacial tension is mN/m. Surface tension ($\gamma_{oa}$, $\gamma_{wa}$) and interfacial tension ($\gamma_{ow}$) measurements were performed by the pendant drop method at ambient conditions (temperature=22 to 24° C. and relative humidity=18 to 26%). Density of water used for measurements was 0.997 gm/ml and density of w/o nanoemulsion was calculated by weighing multiple droplets of nanoemulsion on a weighing balance. The values denote mean of three independent measurements and error denotes standard deviation.

TABLE 1

Condition for stability of SNIPS in presence of water droplet:
$\Delta E = \gamma_{oa} \cos \Theta_{os(a)} - \gamma_{wa} \cos \Theta_{ws(a)} - \gamma_{ow} \geq 0$
$\Delta E$ for SNIPS = 47.4 ± 2 mN/m

| Parameters | Values |
|---|---|
| $\Theta_{ws(a)}$ | 114 ± 1 |
| $\Theta_{os(a)}$ | 41 ± 1 |
| $\gamma_{ow}$ | 2.4 ± 0.4 |
| $\gamma_{oa}$ | 27.2 ± 0.6 |
| $\gamma_{wa}$ | 72.1 ± 0.2 |

Figure 5:
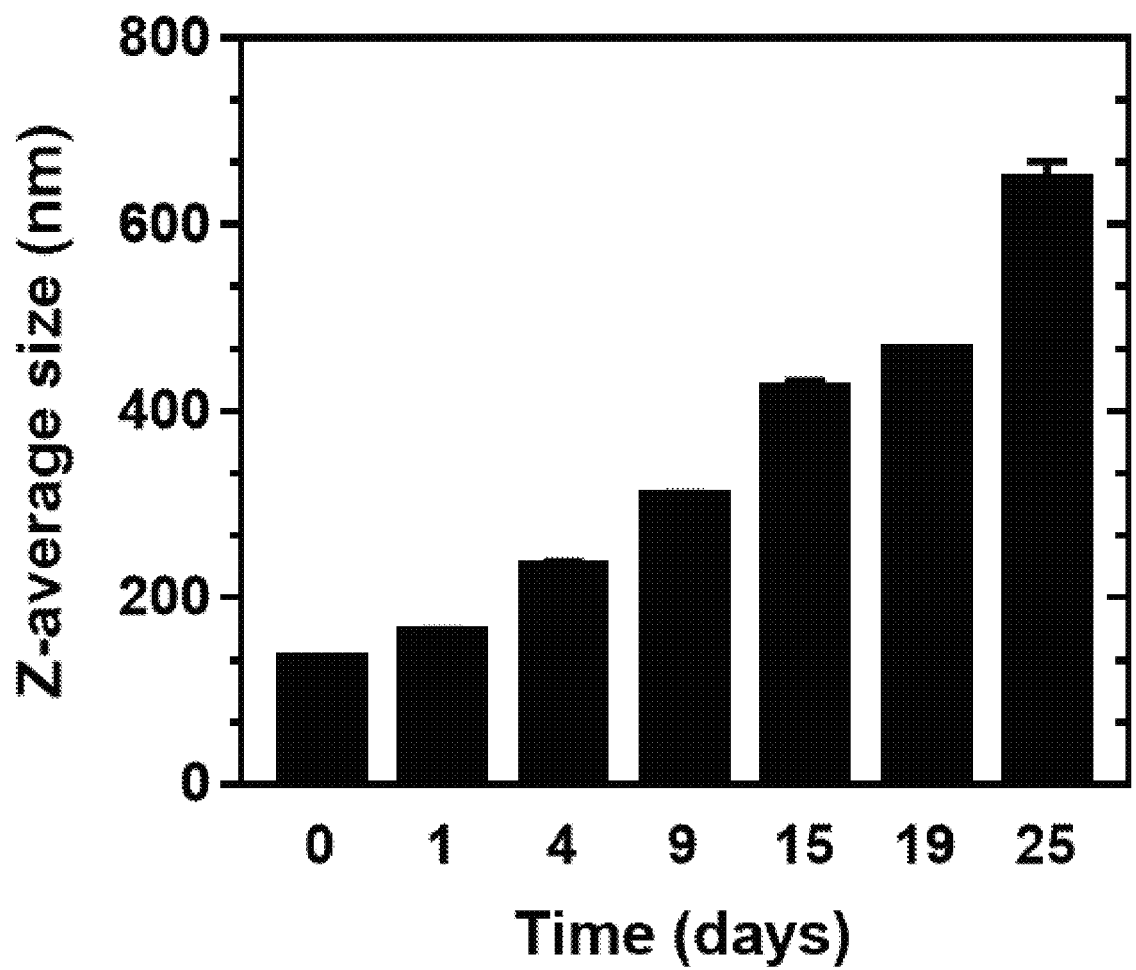
FIG. 5: Plot showing Z-average size vs time for w/o nanoemulsion incubated at 37° C. Data points represent mean of three independent DLS measurements. Error bars denote standard deviation.

A plot showing the average size versus time for w/o nanoemulsion incubated at 37° C. is also shown in FIG. 5.

Example 2

Fabrication of Nanofiber-Based Meshes

In certain embodiments of the invention, the porous matrix is a nanofiber mesh formed by electrospinning or blowspinning.

Fabrication of Nanofiber-Based Meshes by Electrospinning. A 200 mg/mL polymer solution was prepared by dissolving PVDF (polyvinylidene fluoride) in a 1:1 mixture (v/v) of acetone and DMF. Electrospinning was performed using a custom-built electrospinning device with a digital syringe pump (Harvard Bioscience Company) at a flow rate of 1 mL/h. A 30 cm working distance separated the blunt 22 G needle and the 10×10 cm grounded collector. A 20 kV potential was applied between the needle tip and collector. Fibers were collected for ~1 hour onto an aluminum foil directly placed on the ground collector. After fabrication, nanofiber coatings were stored in a vacuum desiccator prior to use.

Figure 18:
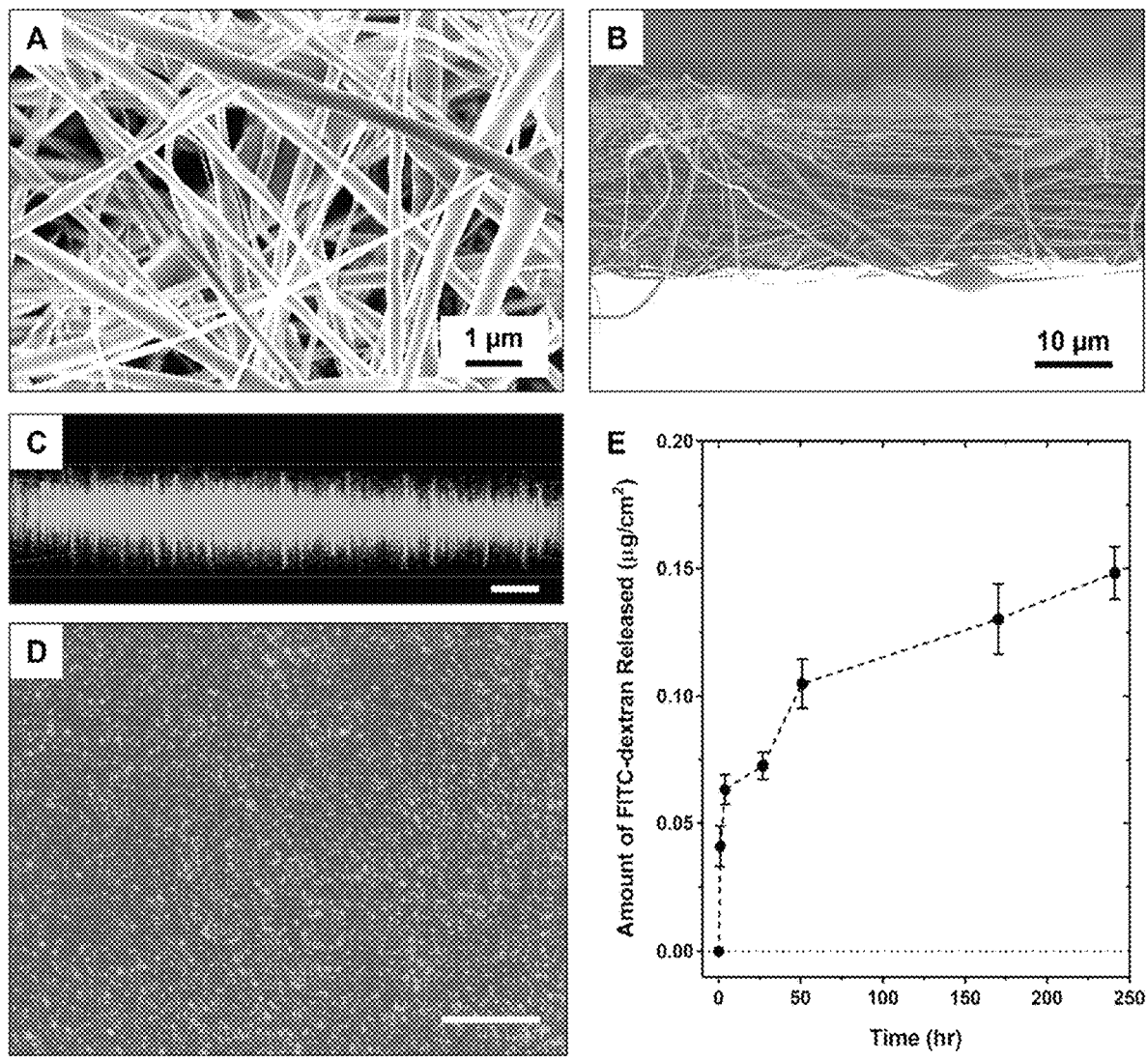
FIG. 18: Top-down (A) and cross-sectional (B) SEM images of an electrospun PVDF (polyvinylidene fluoride) mesh. C) Fluorescence microscopy image of FITC-dextran-infused PVDF meshes showing combined Z-stack obtained using confocal microscopy; scale bars are 200 μm. The bounding box shows the x-z plane. D) 'Top-down' fluorescence microscopy image of a FITC-dextran-infused PVDF mesh; scales bars are 400 μm. (E) Plot showing the amount of FITC-dextran released over time upon incubation in PBS buffer at 37° C. Data points represent the mean of three replicates and error bars represent standard deviation. The total loading amount of FITC-dextran in these materials was ~0.55 μg/cm².

FIG. 18 (panels A, B) shows SEM images of an electrospun PVDF mesh. Fluorescence microscopy images of a FITC-dextran-infused electrospun PVDF mesh are also shown (panels C, D), as well as a plot showing the amount of FITC-dextran released from the electrospun mesh over a period of ten days.

Fabrication of Nanofiber-Based Meshes by Blow Spinning. PCL solution (5% w/v in DCM) was loaded into a 6 mL syringe. The syringe was then placed in a syringe pump (New Era Pump Systems Inc., NY, USA) and connected to the inner (22 G) nozzle. The outer (17 G) nozzle was connected to a compressed nitrogen tank. Before spraying, the substrate was positioned ~7.5 cm from the nozzle tip. The syringe pump was set to deliver 40 μL/min and the gas pressure supplied was 20 psi. Each substrate was sprayed with PCL until a uniform coating was obtained.

Figure 19:
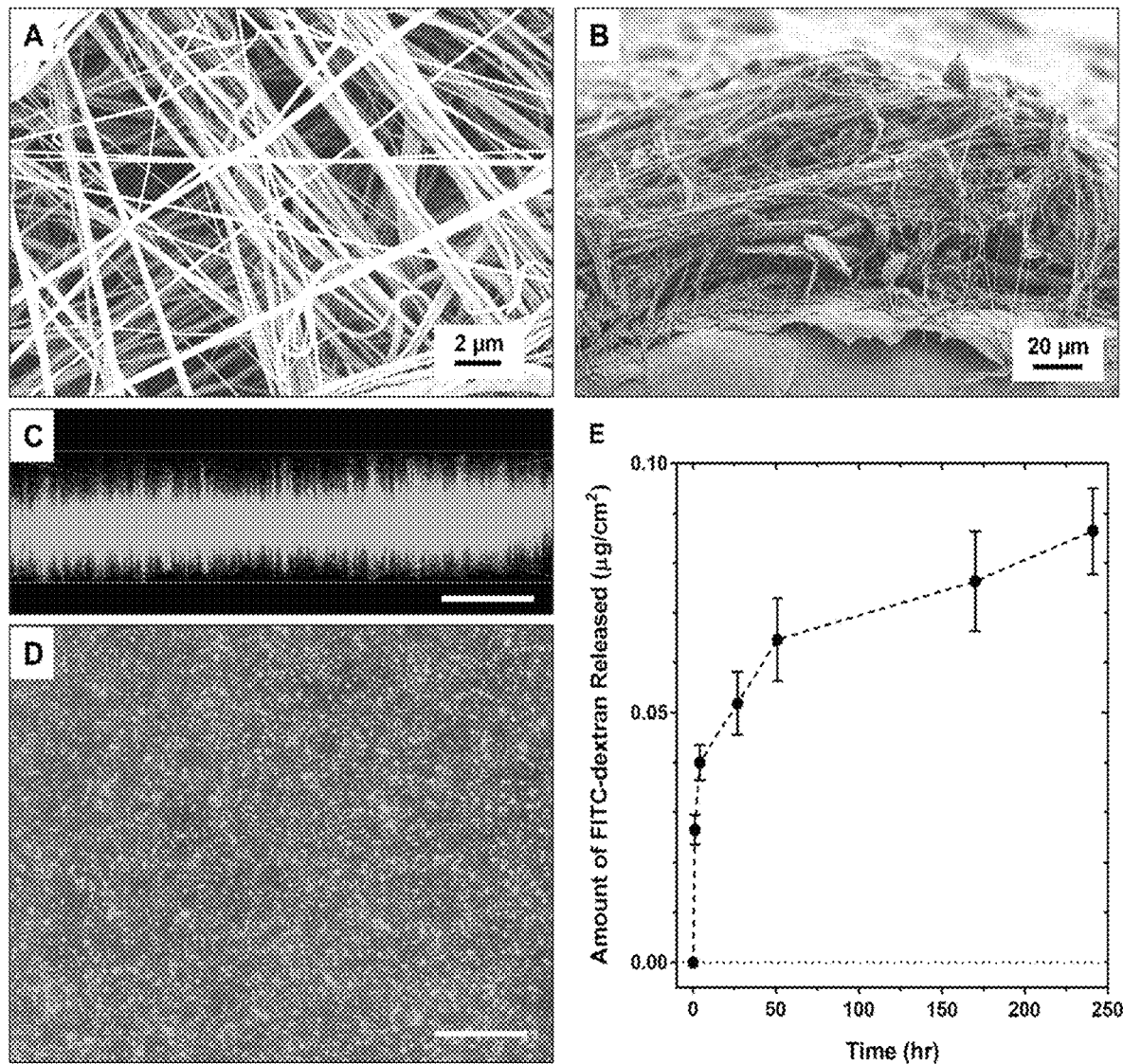
FIG. 19: Top-down (A) and cross-sectional (B) SEM images of a blow spun PCL (polycaprolactone) mesh. C) Fluorescence microscopy image of FITC-dextran-infused PCL meshes showing combined Z-stack obtained using confocal microscopy; scale bars are 500 μm. The bounding box shows the x-z plane. D) 'Top-down' fluorescence microscopy image of a FITC-dextran-infused PCL mesh; scale bars are 400 μm. (E) Plot showing the amount of FITC-dextran released over time upon incubation in PBS buffer at 37° C. Data points represent the mean of three replicates and error bars represent standard deviation. The total loading amount of FITC-dextran in these materials was ~0.68 μg/cm².

FIG. 19 (panels A, B) shows SEM images of a blow spun PCL mesh. Fluorescence microscopy images of a FITC-dextran-infused blow spun PCL mesh are also shown (panels C, D), as well as a plot showing the amount of FITC-dextran released over a period of ten days.

All samples of the electrospun PVDF mesh and blow spun PCL mesh were slippery during the course of the release experiments (20 µL droplets slid at an angle of) 20°.

Example 3

Loading and Release of Molecules from Nanoemulsion Materials

Loading and Release of a Protein. Bovine serum albumin (BSA)-loaded nanoemulsions are prepared by dissolving 5 mg/ml BSA in the water phase before adding to the oil phase (consisting of oil, such as n-hexadecane and mixture of surfactants with low and hydrophilic-lipophilic balance (HLB) value, such as Tween 80 and Span 80). The water phase is gently added to the oil phase under constant stirring, and then the mixture is left stirring at room temperature for ~10 mins.

The obtained nanoemulsion is then loaded into chemically compatible porous matrices, such as PTFE membranes, to fabricate slippery nanoemulsion-infused surfaces. Characterization of the release of BSA from these slippery materials is performed by incubating these materials in PBS buffer at 37° C. and collecting and analyzing the PBS solution at predetermined timepoints by either UV absorbance, fluorescence, or other chemical characterization techniques. Sliding times are also measured at predetermined time points during the controlled release experiments by placing the required volume of droplets ~20 µL on the surfaces of these BSA-loaded slippery materials tilted at ~30°.

Loading and Release of an Antimicrobial Peptide. Antimicrobial peptide (AFP)-loaded nanoemulsions are prepared by dissolving 1 mg/ml AFP in the water phase before adding to the oil phase (consisting of oil, such as n-hexadecane and a mixture of surfactants with low and hydrophilic-lipophilic balance (HLB) value, such as Tween 80 and Span 80). The water phase is gently added to the oil phase under constant stirring, and then the mixture is left stirring at room temperature for ~10 mins.

The obtained nanoemulsion is then loaded into chemically compatible porous matrices, such as PTFE membranes, to fabricate slippery nanoemulsion-infused surfaces. Characterization of AFP release from these slippery materials is performed by incubating these materials in PBS buffer at 37° C. and collecting and analyzing the PBS solution at predetermined timepoints by either UV absorbance, fluorescence, or other chemical characterization techniques. Sliding times are also measured at predetermined time points during the controlled release experiments by placing the required volume of droplets ~20 µL on the surfaces of these AFP-loaded slippery materials tilted at ~30°.

Loading and Release of a Nucleic Acid. Nucleic acid-loaded nanoemulsions are prepared by dissolving 1 mg/ml of a nucleic acid in the water phase before addition to the oil phase (consisting of oil, such as n-hexadecane and the mixture of surfactants with low and hydrophilic-lipophilic balance (HLB) value, such as Tween 80 and Span 80). The water phase is gently added to the oil phase under constant stirring, and then the mixture is left stirring at room temperature for ~10 mins.

The obtained nanoemulsion is then loaded into chemically compatible porous matrices, such as PTFE membranes, to fabricate slippery nanoemulsion-infused surfaces. Characterization of the release of nucleic acid from these slippery materials is performed by incubating these materials in PBS buffer at 37° C. and collecting and analyzing the PBS solution at predetermined timepoints by either UV absorbance, fluorescence, or other chemical characterization techniques. Sliding times are also measured at predetermined time points during the controlled release experiments by placing the required volume of droplets ~20 µL on the surfaces of these nucleic acid-loaded slippery materials tilted at ~30°.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

One of ordinary skill in the art will appreciate that starting materials, reagents, purification methods, materials, substrates, device elements, analytical methods, assay methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that the use of such terms and expressions exclude any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

When a group of materials, compositions, components or compounds is disclosed herein, it is understood that all individual members of those groups and all subgroups thereof are disclosed separately. When a Markush group or other grouping is used herein, all individual members of the group and all combinations and subcombinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. In the disclosure and the claims, "and/or" means additionally or alternatively. Moreover, any use of a term in the singular also encompasses plural forms.

All references cited herein are hereby incorporated by reference in their entirety to the extent that there is no inconsistency with the disclosure of this specification. Some references provided herein are incorporated by reference to provide details concerning sources of starting materials, additional starting materials, additional reagents, additional methods of synthesis, additional methods of analysis, additional biological materials, and additional uses of the invention. All headings used herein are for convenience only. All patents and publications mentioned in the specification are indicative of the levels of skill of those skilled in the art to which the invention pertains, and are herein incorporated by reference to the same extent as if each individual publication, patent or patent application was specifically and individually indicated to be incorporated by reference. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

The invention claimed is:

1. A slippery material able to controllably release molecules into a surrounding environment, wherein said material comprises:
   a) a porous matrix;
   b) an emulsion covering at least a portion of the porous matrix, said emulsion comprising a liquid continuous phase and a plurality of liquid droplets dispersed within the continuous phase, wherein said emulsion at least partially fills the pores of the porous matrix and allows other liquids and compounds to slide off the material without adhering to the material; and
   c) one or more molecules dispersed within the plurality of liquid droplets,
   wherein the material is able to controllably release the one or more molecules when the material is immersed into the surrounding environment, and
   wherein other liquids and compounds are able to slide off the material with a sliding angle of 30°.

2. The material of claim 1 wherein the liquid continuous phase is hydrophobic and the plurality of liquid droplets comprise water or a hydrophilic liquid, and wherein the one or more molecules able to be controllably released by the emulsion are water soluble.

3. The material of claim 1 wherein the liquid continuous phase is hydrophilic and the plurality of liquid droplets are hydrophobic.

4. The material of claim 1 wherein the emulsion is a macroemulsion or nanoemulsion.

5. The material of claim 1 wherein the liquid continuous phase comprises an oil selected from the group consisting of a hydrocarbon-based oil, a silicone oil, a vegetable oil, a mineral oil, a perfluorinated oil, a thermotropic liquid crystal, and combinations thereof.

6. The material of claim 1 wherein the one or more molecules are selected from the group consisting of proteins, peptides, saccharides, nucleic acids, plasmid DNA, biologics, small molecules, and combinations thereof.

7. The material of claim 1 wherein the one or more molecules are able to reduce, inhibit, or modulate the behaviors of non-adherent pathogens in surrounding media.

8. The material of claim 1 wherein the one or more molecules are natural or synthetic antibiotic agents, natural or synthetic antifungal agents, agents that modulate bacterial or fungal quorum sensing, agents that attenuate virulence, or combinations thereof.

9. The material of claim 1 wherein the one or more molecules are selected from the group consisting of acyl L-homoserine lactone (AHL) derivatives, aminobenzimidazole (ABI) derivatives, and combinations thereof.

10. The material of claim 1 wherein other liquids and compounds are able to slide off the material with a sliding angle of 20°.

11. The material of claim 1 wherein the porous matrix is microporous polytetrafluoroethylene (PTFE), a nanofiber mesh, or a fiber mat.

12. The material of claim 1 wherein the porous matrix comprises a multilayer film having two or more layers, wherein each layer comprises a first polymer in contact with a second polymer, where said multilayer film has nanoscale or microscale porosity.

13. The material of claim 12 wherein the first polymer comprises a functionalized azlactone having the formula:

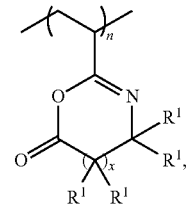

wherein x is 0 or the integers 1 or 2; and each $R^1$ is independently selected from the group consisting of: hydrogen, alkyl groups, alkenyl groups, alkynyl groups, carbocyclic groups, heterocyclic groups, aryl groups, heteroaryl groups, alkoxy groups, aldehyde groups, ether groups, and ester groups, any of which may be substituted or unsubstituted.

14. The material of claim 12 wherein the first polymer comprises a polymer selected from the group consisting of poly(vinyl-4,4-dimethylazlactone), poly(2-vinyl-4,4-dimethyl-2-oxazolin-5-one), poly(2-isopropenyl-4,4-dimethyl-2-oxazolin-5-one), poly(2-vinyl-4,4-diethyl-2-oxazolin-5-one), poly(2-vinyl-4-ethyl-4-methyl-2-oxazolin-5-one), poly(2-vinyl-4-dodecyl-4-methyl-2-oxazolin-5-one), poly (2-vinyl-4,4-pentamethylene-2-oxazolin-5-one), poly (2-vinyl-4-methyl-4-phenyl-2-oxazolin-5-one), poly(2-isopropenyl-4-benzyl-4-methyl-2-oxazolin-5-one), or poly(2-vinyl-4,4-dimethyl-1,3-oxazin-6-one).

15. The material of claim 1 wherein materials used for the fabrication of porous meshes comprise homopolymers and copolymers comprising polyvinyl chloride (PVC), polycarbonate, polytetrafluoroethylene (PTFE), poly(methyl methacrylate), PDMS, polystyrene (PS), polyvinylidene difluoride (PVDF), polyethylene, polybutadiene and combinations thereof.

16. The material of claim 1 wherein the porous matrix comprises homopolymers and copolymers comprising polcaprolactone, polylactic acid, poly glycolic acid, poly(lactic-co-glycolic acid).

17. The material of claim 12 wherein the second polymer comprises a primary amine functionalized polymer, an alcohol functionalized polymer, or a thiol functionalized polymer.

18. The material of claim 1 wherein the porous matrix is microporous polytetrafluoroethylene (PTFE), the liquid continuous phase comprises a hydrocarbon-based oil, the plurality of liquid droplets comprise water, and the one or more molecules are hydrophilic.

19. The material of claim 1 wherein the time necessary to release at least 50% of the one or more molecules dispersed within the plurality of liquid droplets to the surrounding environment is 10 days or more.

20. A method for fabricating a slippery material able to reduce, inhibit, or modulate the behaviors of non-adherent pathogens in surrounding media, said method comprising the steps of:

a) providing a porous matrix;

b) exposing the porous matrix to a macroemulsion or nanoemulsion, said macroemulsion or nanoemulsion comprising a liquid continuous phase and a plurality of liquid droplets dispersed within the continuous phase, wherein said plurality of liquid droplets contains one or more molecules, and wherein said macroemulsion or nanoemulsion at least partially fills the pores of the porous matrix and allows other liquids and compounds to slide off the material without adhering to the material wherein other liquids and compounds are able to slide off the material with a sliding angle of 30°.

21. The method of claim 20 wherein the liquid continuous phase is an oil and the plurality of liquid droplets comprise water, said method further comprising the step of forming the macroemulsion or nanoemulsion by:

i) forming an oil-in-water emulsion, wherein the one or more molecules are added to an aqueous liquid forming the oil-in-water emulsion, ii) adding additional amounts of the oil to the oil-water-emulsion, and iii) mixing the oil-in-water emulsion with the additional amounts of the oil to cause an emulsion inversion and form a water-in-oil macroemulsion or nanoemulsion, wherein the plurality of liquid droplets in the formed water-in-oil emulsion contain the one or more molecules.

22. The method of claim 20 wherein providing a porous matrix comprises electrospinning or blow spinning a nanofiber-based mesh.

23. The method of claim 20 wherein the one or more molecules are loaded prior to the exposing step, after the exposing step, or during the exposing step.

24. A method for reducing, inhibiting, or modulating the behaviors of non-adherent pathogens in media surrounding a substrate comprising the steps of:

a) providing a slippery material on the substrate, said material comprising:

i) a porous matrix;

ii) an emulsion covering at least a portion of the porous matrix, said emulsion comprising a liquid continuous phase and a plurality of liquid droplets dispersed within the continuous phase, wherein said emulsion at least partially fills the pores of the porous matrix and allows other liquids and compounds to slide off the material without adhering to the material; and iii) one or more molecules dispersed within the plurality of liquid droplets, wherein said one or more molecules are able to reduce, inhibit, or modulate the behaviors said pathogens upon contact with said pathogens, wherein other liquids and compounds are able to slide off the material with a sliding angle of 30°;

b) controllably releasing the one or more molecules from the emulsion into said media, wherein the one or more molecules contact the pathogens thereby reducing the number of pathogens, inhibiting the growth or colonization of the pathogens, or modulating the behaviors of the pathogens.

25. The method of claim 24 wherein the liquid continuous phase is hydrophobic, the plurality of liquid droplets comprise water or a hydrophilic liquid, and the one or more molecules are water soluble.

26. The method of claim 24 wherein the one or more molecules are antimicrobial agents, antifungal agents, antibacterial agents, agents that modulate bacterial or fungal quorum sensing, agents that attenuate virulence, or combinations thereof.

27. The method of claim 24 wherein the one or more molecules are hydrophilic and have a molecular weight of 500 daltons or less.

28. The method of claim 24 wherein the non-adherent pathogens are bacteria, fungi, or a combination thereof.

* * * * *